US008964255B2

(12) United States Patent
Miyazaki et al.

(10) Patent No.: US 8,964,255 B2
(45) Date of Patent: Feb. 24, 2015

(54) DISPLAY PROCESSING APPARATUS, DISPLAY PROCESSING SYSTEM, DISPLAY PROCESSING METHOD, AND COMPUTER PROGRAM PRODUCT

(71) Applicants: Ryonosuke Miyazaki, Tokyo (JP); Yasushi Yamaguchi, Tokyo (JP); Hiroyuki Yoshida, Tokyo (JP); Tomoyoshi Takeuchi, Tokyo (JP)

(72) Inventors: Ryonosuke Miyazaki, Tokyo (JP); Yasushi Yamaguchi, Tokyo (JP); Hiroyuki Yoshida, Tokyo (JP); Tomoyoshi Takeuchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/858,197

(22) Filed: Apr. 8, 2013

(65) Prior Publication Data

US 2013/0271791 A1 Oct. 17, 2013

(30) Foreign Application Priority Data

Apr. 11, 2012 (JP) ................................ 2012-090586

(51) Int. Cl.
*H04N 1/46* (2006.01)
*G06K 15/02* (2006.01)
(Continued)

(52) U.S. Cl.
CPC ............ *G06K 15/025* (2013.01); *G06F 3/1208* (2013.01); *G06F 3/1256* (2013.01); *H04N 1/54* (2013.01); *G06F 3/1285* (2013.01)
USPC ........................................ 358/3.24; 358/1.18

(58) Field of Classification Search
CPC ................ G03G 15/6585; G03G 2215/00805; G03G 2215/0081; G03G 15/0178; G03G 2215/0602; B41M 1/18; B41M 3/008; B41M 7/0027; B41M 5/0047; H04N 1/54; H04N 1/6097; H04N 1/60
USPC .......... 358/1.9, 2.1, 1.1, 3.24, 1.18, 502, 518; 399/341, 223, 67, 321; 427/265, 256
See application file for complete search history.

(56) References Cited

U.S. PATENT DOCUMENTS 8,330,992 B2 * 12/2012 Kuroda ........................... 358/1.9
8,649,696 B2 * 2/2014 Takemura ....................... 399/67
(Continued)

FOREIGN PATENT DOCUMENTS

EP     2 154 578 A2     2/2010
JP     2008-145784      6/2008
(Continued)

OTHER PUBLICATIONS

Extended European Search Report issued Jul. 24, 2013, in European Patent Application No. 13163046.9.

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

A display processing apparatus includes a transparent display data generating unit and a preview image generating unit. Based on document data including color plane image data indicating an area for which use of a color developer is specified and transparent plane image data indicating an area for which use of a transparent developer is specified together with the type of transparent processing performed on the area by using the transparent developer, the transparent display data generating unit generates pieces of transparent display data showing a result of image formation corresponding to the transparent processing with the transparent developer for each type of transparent processing. The preview image generating unit generates a preview image by projecting a color display plane on which the color plane image data is displayed and transparent display planes on which the pieces of transparent display data are displayed in a three-dimensional space onto a two-dimensional plane.

8 Claims, 26 Drawing Sheets

(51) Int. Cl.
*G06F 3/12* (2006.01)
*H04N 1/54* (2006.01)

(56) References Cited

U.S. PATENT DOCUMENTS

| | | |
|---|---|---|
| 8,655,228 B2 * | 2/2014 | Fukamachi .................. 399/127 |
| 2003/0086101 A1 | 5/2003 | Miyano |
| 2007/0211269 A1 | 9/2007 | Patrick et al. |
| 2010/0027040 A1 | 2/2010 | Kuroda |
| 2011/0141498 A1 | 6/2011 | Matsushita et al. |
| 2011/0267654 A1 | 11/2011 | Matsunaga |
| 2012/0050759 A1 | 3/2012 | Yoshihara |
| 2013/0063785 A1 | 3/2013 | Miyazaki et al. |

FOREIGN PATENT DOCUMENTS

| | | |
|---|---|---|
| JP | 2011-140135 | 7/2011 |
| JP | 2013-77293 A | 4/2013 |
| WO | WO 2011/083654 A1 | 7/2011 |
| WO | WO 2011/083675 A1 | 7/2011 |

* cited by examiner

IMAGE DATA OF COLOR PLANE

| NAME OF GLOSS CONTROL | GLOSSINESS | DEVIATION |
|---|---|---|
| PREMIUM GLOSS (PG) | Gs ≥ 80 | ΔGs ≤ 10 |
| GLOSS (G) | Gs = Gs (GLOSS) | ΔGs ≤ 10 |
| MATT (M) | Gs = Gs (1C30% HALFTONE DOTS) | ΔGs ≤ 10 |
| PREMIUM MATT (PM) | Gs ≤ 10 | ΔGs ≤ 10 |

IMAGE DATA OF GLOSS-CONTROL PLANE

▨ : AREA FOR WHICH G IS SPECIFIED (DENSITY VALUE 90%)

▧ : AREA FOR WHICH M IS SPECIFIED (DENSITY VALUE 16%)

IMAGE DATA OF CLEAR PLANE

FIG.9

| TYPE OF SURFACE EFFECT SPECIFIED BY USER | DENSITY VALUE OF IMAGE DATA OF GLOSS-CONTROL PLANE (%) |
|---|---|
| PG | 98% |
| G | 90% |
| M | 16% |
| PM | 6% |

| TYPE OF CLEAR PROCESSING | SPECULAR REFLECTANCE | DIFFUSE REFLECTANCE | ENVIRONMENTAL REFLECTANCE |
|---|---|---|---|
| PG | 10 | 4 | 9 |
| G | 8 | 3 | 9 |
| M | 6 | 3 | 9 |
| PM | 4 | 3 | 9 |
| ⋮ | ⋮ | ⋮ | ⋮ |
| IMAGE DATA OF COLOR PLANE | 3 | 2 | 9 |

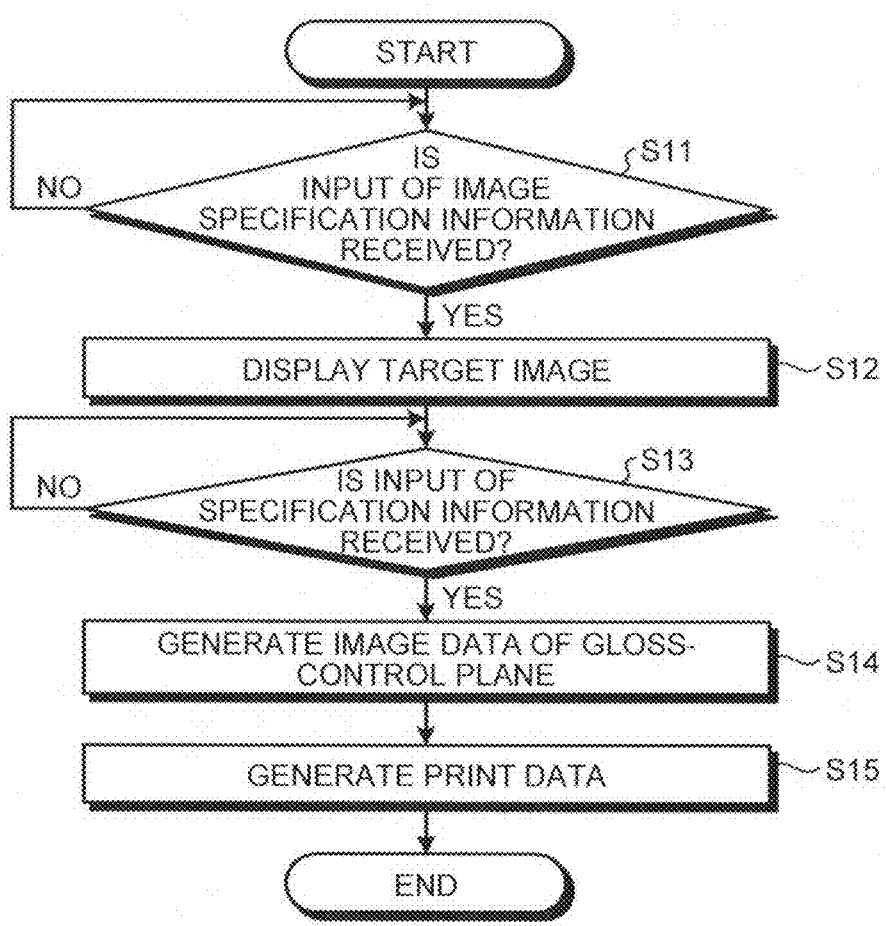

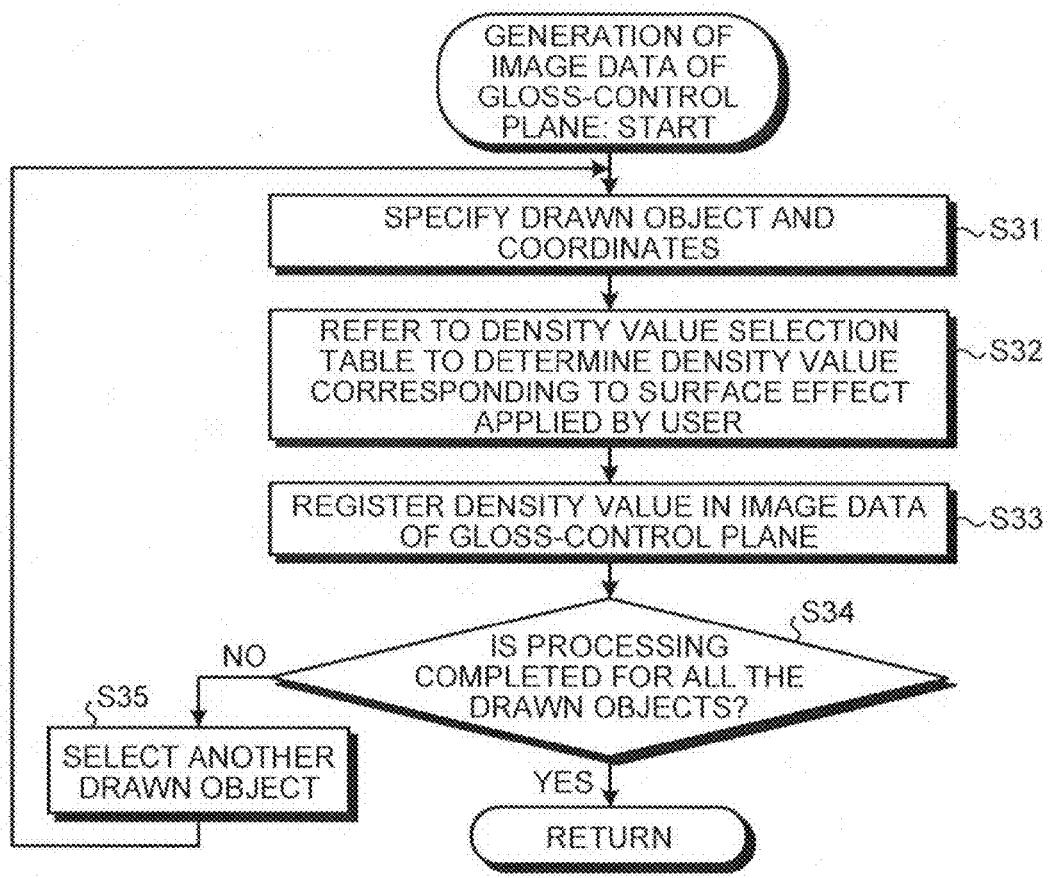

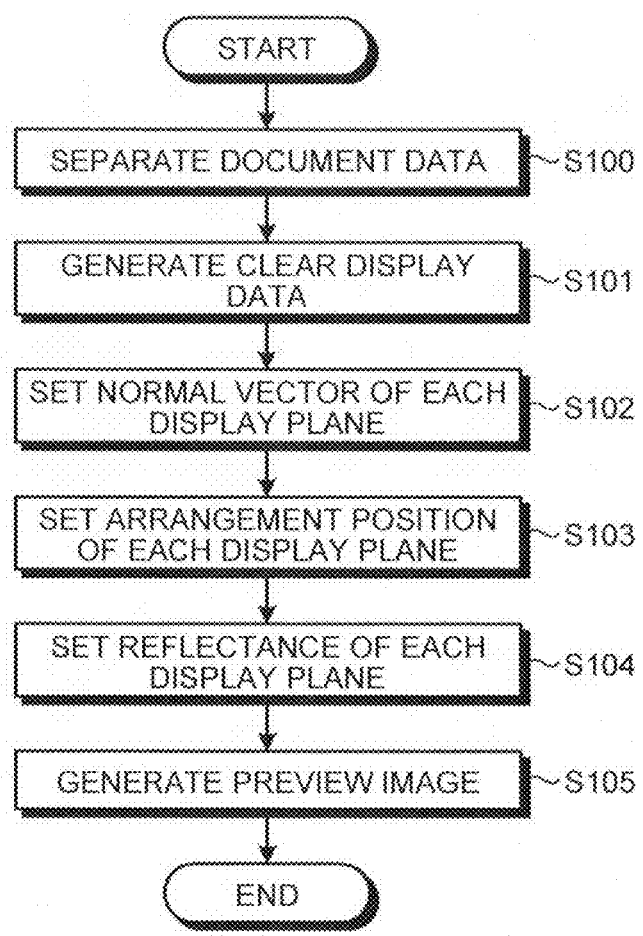

FIG.25

| DENSITY RATE (%) | DENSITY VALUE | | SURFACE EFFECT | GLOSSER ON/OFF (ON-OFF INFORMATION) | CLEAR-TONER PLANE 1 (PRINTER DEVICE) | CLEAR-TONER PLANE 2 (LOW-TEMPERATURE FIXING UNIT) |
| --- | --- | --- | --- | --- | --- | --- |
| | REP VALUE | VALUE RANGE | | | | |
| 98% | 250 | 248  255 | PREMIUM GLOSS TYPE A | ON | INVERSE MASK A | NO DATA |
| 96% | 245 | 243  247 | PREMIUM GLOSS TYPE B | ON | INVERSE MASK B | NO DATA |
| 94% | 240 | 238  242 | PREMIUM GLOSS TYPE C | ON | INVERSE MASK C | NO DATA |
| 92% | 235 | 233  237 | RESERVED | | | |
| 90% | 230 | 228  232 | GLOSS TYPE 1 | OFF | INVERSE MASK 1 | NO DATA |
| 88% | 224 | 222  227 | GLOSS TYPE 2 | OFF | INVERSE MASK 2 | NO DATA |
| 86% | 219 | 217  221 | GLOSS TYPE 3 | OFF | INVERSE MASK 3 | NO DATA |
| 84% | 214 | 212  216 | GLOSS TYPE 4 | OFF | INVERSE MASK 4 | NO DATA |
| 82% | 209 | 207  211 | RESERVED | | | |
| 46% | 117 | 115  119 | RESERVED | | | |
| 44% | 112 | 110  114 | WATERMARK CHARACTER 3 (XXX) | OFF | NO DATA | TILE CHARACTER STRING 3 |
| 42% | 107 | 105  109 | WATERMARK CHARACTER 2 (COPYING IS STRICTLY PROHIBITED) | | NO DATA | TILE CHARACTER STRING 2 |
| 40% | 102 | 100  104 | WATERMARK CHARACTER 1 (SAMPLE) | | NO DATA | TILE CHARACTER STRING 1 |
| 38% | 97 | 95  99 | RESERVED | | | |
| 36% | 92 | 90  94 | RESERVED | | | |
| 34% | 87 | 85  89 | BACKGROUND PATTERN 3 (XXX) | | NO DATA | TILE BACKGROUND PATTERN3 |
| 32% | 82 | 80  84 | BACKGROUND PATTERN 2 (CHECK PATTERN) | | NO DATA | TILE BACKGROUND PATTERN2 |
| 30% | 76 | 74  79 | BACKGROUND PATTERN 1 (WAVE PATTERN) | | NO DATA | TILE BACKGROUND PATTERN1 |
| 28% | 71 | 69  73 | RESERVED | | | |
| 26% | 66 | 64  68 | RESERVED | | | |
| 24% | 61 | 59  63 | TACTILE PATTERN TYPE 3 (COARSE) | | NO DATA | TILE MESH PATTERN3 |
| 22% | 56 | 54  58 | TACTILE PATTERN TYPE 2 (MIDDLE) | | NO DATA | TILE MESH PATTERN2 |
| 20% | 51 | 49  53 | TACTILE PATTERN TYPE 1 (FINE) | | NO DATA | TILE MESH PATTERN1 |
| 18% | 46 | 44  48 | RESERVED | | | |
| 16% | 41 | 39  43 | MATT TYPE 4 | OFF | HALFTONE 4 | NO DATA |
| 14% | 36 | 34  38 | MATT TYPE 3 | OFF | HALFTONE 3 | NO DATA |
| 12% | 31 | 29  33 | MATT TYPE 2 | OFF | HALFTONE 2 | NO DATA |
| 10% | 25 | 23  28 | MATT TYPE 1 | OFF | HALFTONE 1 | NO DATA |
| 8% | 20 | 18  22 | RESERVED | | | |
| 6% | 15 | 13  17 | PREMIUM MATT TYPE C | ON&OFF | NO DATA | SOLID |
| 4% | 10 | 8  12 | PREMIUM MATT TYPE B | ON&OFF | NO DATA | SOLID |
| 2% | 5 | 1  7 | PREMIUM MATT TYPE A | ON&OFF | NO DATA | SOLID |
| 0% | 0 | 0  0 | NONE | OFF | NO DATA | NO DATA |

DISPLAY PROCESSING APPARATUS, DISPLAY PROCESSING SYSTEM, DISPLAY PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-090586 filed in Japan on Apr. 11, 2012.

BACKGROUND OF THE INVENTION

1. Field of the Invention

The present invention relates to a display processing apparatus, a display processing system, a display processing method, and a computer program product.

2. Description of the Related Art

Conventionally widely known is a printing system for printing an image with a clear toner, which is a transparent developer. In such a printing system, document data for using a clear toner is generated by an application program before printing. Subsequently, a printer separates the document data into a plane for toners of cyan (C), magenta (M), yellow (Y), and black (K) and a plane for the clear toner to print an image by a printer engine.

Further widely known is a printing system for displaying a preview image that shows a print result on a screen of a personal computer or the like before actual printing. Displaying a preview image in this manner enables a user to check the print result before the printing, thereby preventing misprints. Japanese Patent Application Laid-open No. 2008-145784, for example, discloses a technique for retaining document image data for CMYK and data for a clear toner separately and displaying an image obtained by synthesizing these pieces of image data as a preview image. In the technique, a portion of the clear toner is displayed with a color that does not exist in the document data. Japanese Patent Application Laid-open No. 2011-140135 discloses a technique for simulatively displaying representation generated by light reflection on a display.

In the conventional techniques, however, even if different gloss effects are set for respective areas, areas for which the clear toner is to be used are collectively processed and displayed in a preview image. This prevents a checker of the preview image from readily knowing difference among the gloss effects, the status of transparent characters, and other factors from the preview image.

Therefore, there is a need for a display processing apparatus, a display processing system, a display processing method, and a computer program product that are capable of displaying a preview image that enables a user to readily know a print result of each type of processing with a transparent developer.

SUMMARY OF THE INVENTION

According to an embodiment, there is provided a display processing apparatus that performs display processing of a preview image showing a result of image formation of document data in an image forming apparatus. The document data includes color plane image data and transparent plane image data. The color plane image data includes a plurality of drawing areas and indicates an area for which use of a color developer in the image forming apparatus is specified. The transparent plane image data indicates an area for which use of a transparent developer in the image forming apparatus is specified together with a type of transparent processing performed on the area by using the transparent developer in units of the drawing areas. The display processing apparatus includes a transparent display data generating unit, a preview image generating unit, and a display control unit. The transparent display data generating unit generates, based on the document data, a plurality of pieces of transparent display data that show a result of image formation corresponding to the transparent processing performed with the transparent developer on the drawing areas on which the same transparent processing is performed for each type of the transparent processing. The preview image generating unit arranges a color display plane on which the color plane image data is displayed at a predetermined position of the color display plane in the preview image and arranges in a superimposed manner a plurality of transparent display planes on which the pieces of transparent display data are displayed at a plurality of positions of the transparent display planes that are determined based on the position of the color display plane in accordance with a predetermined rule and that are different from one another, so as to generate the preview image obtained by projecting the color display plane and the transparent display planes that are arranged in a three-dimensional space onto a two-dimensional plane. The display control unit displays the preview image on a display screen.

According to another embodiment, there is provided a display processing system that performs display processing of a preview image showing a result of image formation of document data in an image forming apparatus. The document data includes color plane image data and transparent plane image data. The color plane image data includes a plurality of drawing areas and indicates an area for which use of a color developer in the image forming apparatus is specified. The transparent plane image data indicates an area for which use of a transparent developer in the image forming apparatus is specified together with a type of transparent processing performed on the area by using the transparent developer in units of the drawing areas. The display processing system includes a transparent display data generating unit, a preview image generating unit, and a display control unit. The transparent display data generating unit generates, based on the document data, a plurality of pieces of transparent display data that show a result of image formation corresponding to the transparent processing performed with the transparent developer on the drawing areas on which the same transparent processing is performed for each type of the transparent processing. The preview image generating unit arranges a color display plane on which the color plane image data is displayed at a predetermined position of the color display plane in the preview image and arranges in a superimposed manner a plurality of transparent display planes on which the pieces of transparent display data are displayed at a plurality of positions of the transparent display planes that are determined based on the position of the color display plane in accordance with a predetermined rule and that are different from one another, so as to generate the preview image obtained by projecting the color display plane and the transparent display planes that are arranged in a three-dimensional space onto a two-dimensional plane. The display control unit displays the preview image on a display screen.

According to still another embodiment, there is provided a display processing method for performing display processing of a preview image showing a result of image formation of document data in an image forming apparatus. The document data includes color plane image data and transparent plane image data. The color plane image data includes a plurality of drawing areas and indicates an area for which use of a color developer in the image forming apparatus is specified. The transparent plane image data indicates an area for which use of a transparent developer in the image forming apparatus is specified together with a type of transparent processing performed on the area by using the transparent developer in units of the drawing areas. The display processing method includes generating, based on the document data, a plurality of pieces of transparent display data that show a result of image formation corresponding to the transparent processing performed with the transparent developer on the drawing areas on which the same transparent processing is performed for each type of the transparent processing; generating the preview image by arranging a color display plane on which the color plane image data is displayed at a predetermined position of the color display plane in the preview image, arranging in a superimposed manner a plurality of transparent display planes on which the pieces of transparent display data are displayed at a plurality of positions of the transparent display planes that are determined based on the position of the color display plane in accordance with a predetermined rule and that are different from one another, and projecting the color display plane and the transparent display planes that are arranged in a three-dimensional space onto a two-dimensional plane; and displaying the preview image on a display screen.

According to still another embodiment, there is provided a computer program product including a non-transitory computer-readable medium containing a computer program for performing display processing of a preview image showing a result of image formation of document data in an image forming apparatus. The document data includes color plane image data and transparent plane image data. The color plane image data includes a plurality of drawing areas and indicates an area for which use of a color developer in the image forming apparatus is specified. The transparent plane image data indicates an area for which use of a transparent developer in the image forming apparatus is specified together with a type of transparent processing performed on the area by using the transparent developer in units of the drawing areas. The program causes a computer to execute generating, based on the document data, a plurality of pieces of transparent display data that show a result of image formation corresponding to the transparent processing performed with the transparent developer on the drawing areas on which the same transparent processing is performed for each type of the transparent processing; generating the preview image by arranging a color display plane on which the color plane image data is displayed at a predetermined position of the color display plane in the preview image, arranging in a superimposed manner a plurality of transparent display planes on which the pieces of transparent display data are displayed at a plurality of positions of the transparent display planes that are determined based on the position of the color display plane in accordance with a predetermined rule and that are different from one another, and projecting the color display plane and the transparent display planes that are arranged in a three-dimensional space onto a two-dimensional plane; and displaying the preview image on a display screen.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic of an example of a density value selection table;
FIG. 19 is a flowchart of a procedure for generating print data performed by the host device;
FIG. 20 is a flowchart of a procedure for generating a gloss-control plane;
FIG. 21 is a schematic of correspondence relation among drawn objects, coordinates, and density values in the image data of the gloss-control plane illustrated in FIG. 4;
FIG. 22 is a flowchart of a procedure for generating a preview image;
FIG. 25 is an exemplary schematic of a data structure of a surface effect selection table.

DETAILED DESCRIPTION OF THE PREFERRED EMBODIMENTS

Figure 1:
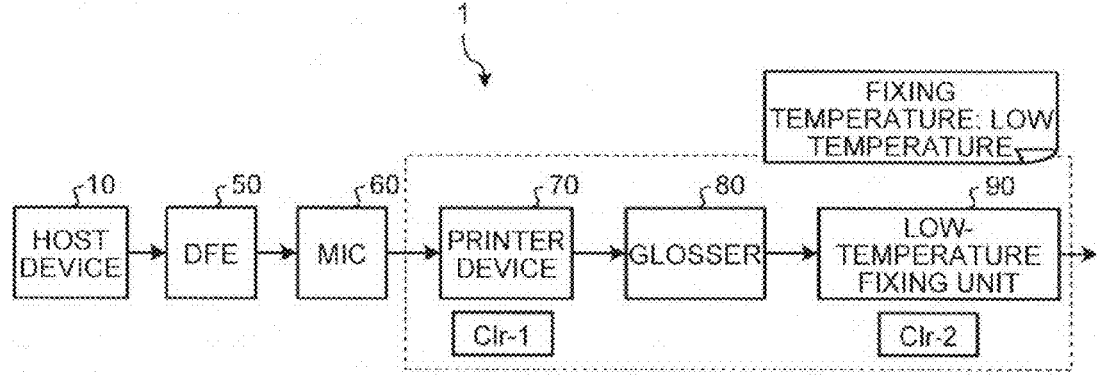
FIG. 1 is an exemplary block diagram of a configuration of an image forming system according to an embodiment of the present invention.

Exemplary embodiments of a display processing apparatus, a display processing system, a display processing method, and a computer program product according to the present invention are described below in greater detail with reference to the accompanying drawings.

A configuration of an image forming system according to an embodiment of the present invention will be described with reference to FIG. 1. An image forming system 1 according to the present embodiment includes a host device 10, a printer control device (digital front end: DFE) 50 (hereinafter, referred to as a "DFE 50"), an interface controller (mechanism I/F controller: MIC) 60 (hereinafter, referred to as an "MIC 60"), a printer device 70, and a glosser 80 and a low-temperature fixing unit 90 serving as post-processing devices connected in series. The DFE 50 communicates with the printer device 70 via the MIC 60 and controls formation of an image in the printer device 70. Furthermore, the DFE 50 is connected to the host device 10, such as a personal computer (PC), and receives image data from the host device 10. The DFE 50 uses the image data to generate image data used for forming toner images corresponding to CMYK toners and a clear toner by the printer device 70. The DFE 50 then transmits the image data thus generated to the printer device 70 via the MIC 60. The printer device 70 is provided with at least CMYK toners and a clear toner. The printer device 70 is further provided with an image forming unit including a photosensitive element, a charger, a developing unit, and a photosensitive-element cleaning unit, an exposing unit, and a fixing unit for each toner.

The clear toner is a transparent (colorless) toner including no color material. Being transparent (colorless) means that the transmittance is equal to or larger than 70%, for example.

The printer device 70 outputs a light beam from the exposing unit correspondingly to image data transmitted from the DFE 50 via the MIC 60 to form a toner image corresponding to each toner on the photosensitive element. The printer device 70 then transfers the toner image onto a sheet serving as a recording medium and fixes the toner image thereon at temperature within a predetermined range (normal temperature) and pressure by the fixing unit. Thus, an image is formed on the sheet. The sheet is given just as an example of the recording medium, and the recording medium is not limited thereto. A piece of synthetic paper and a piece of plastic paper may be used as the recording medium, for example.

The glosser 80 is turned ON or OFF in accordance with ON-OFF information specified by the DFE 50. If the glosser 80 is turned ON, the glosser 80 presses an image formed on a sheet by the printer device 70 at high temperature and high pressure. Subsequently, the glosser 80 cools the sheet on which the image is formed and removes the sheet from its main body. This operation evenly compresses the total amount of attached toners on pixels to which a toner of equal to or larger than a predetermined amount is attached in the whole image formed on the sheet. The low-temperature fixing unit 90 is provided with an image forming unit including a photosensitive element, a charger, a developing unit, and a photosensitive-element cleaning unit for the clear toner, an exposing unit, and a fixing unit that fixes the clear toner. The low-temperature fixing unit 90 receives image data of a clear-toner plane, which will be described later, generated by the DFE 50 to use the low-temperature fixing unit 90. If the DFE 50 generates image data of the clear-toner plane (clear-toner plane image data) used by the low-temperature fixing unit 90, the low-temperature fixing unit 90 uses the clear-toner plane image data to form a toner image with the clear toner. The low-temperature fixing unit 90 then superimposes the toner image on the sheet pressed by the glosser 80 and fixes the toner image on a sheet at temperature or pressure lower than normal temperature and normal pressure, respectively, by the fixing unit.

The image data (document data) received from the host device 10 will now be described. In the host device 10, image data is generated by an image processing application (an image processing unit 120, a plane data generating unit 122, a print data generating unit 123, and other units, which will be described later) installed in advance and is transmitted to the DFE 50. Such an image processing application can deal with image data of a specific color plane in contrast to image data that specifies a value of density (referred to as a density value) of each color in each color plane, such as an RGB plane or a CMYK plane, for each pixel. The specific color plane is image data used for attaching a toner or an ink of a specific color, such as white, gold, and silver, in addition to basic colors, such as CMYK. The specific color plane is data used by a printer provided with a toner or an ink of such a specific color. To improve the color reproducibility, R may be added to the basic colors of CMYK, or Y may be added to basic colors of RGB in the specific color plane. Typically, a clear toner has been considered as one of the specific colors.

The image forming system 1 according to the present embodiment uses a transparent developer, which is a clear toner serving as a specific color, in addition to color developers, which are toners of the basic colors of CMYK. The image forming system 1 according to the present embodiment uses the clear toner to perform a plurality of different types of transparent processing (also referred to as clear processing). The types of clear processing include processing for providing a surface effect, which is a visual or tactile effect applied to a sheet with the clear toner and processing for forming a clear image (a transparent image), such as a watermark and a texture, other than the surface effect on a sheet.

Therefore, the image processing application of the host device 10 generates at least one of image data of a gloss-control plane (also referred to as gloss-control plane image data) and image data of a clear plane (also referred to as clear plane image data) as image data of a specific color plane (also referred to as specific color plane image data) in accordance with a user's specification in addition to image data of a color plane (also referred to as color plane image data) for the image data thus received.

Figure 2:
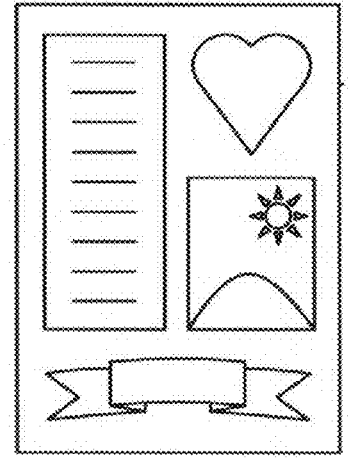
FIG. 2 is a schematic of an example of image data of a color plane.

The image data of the color plane is image data that specifies the density value of a color of RGB or CMYK for each pixel, for example. In the image data of the color plane, one pixel is represented by 8-bits in accordance with the user's specification of a color. FIG. 2 is a view for explaining an example of the image data of the color plane. In FIG. 2, a density value corresponding to a color specified by the user via the image processing application is defined for each object, such as a heart object and a photo object arranged in a square area.

The image data of the gloss-control plane is image data used to perform control for attaching the clear toner correspondingly to a surface effect, which is a visual or tactile effect applied to a sheet, and specifies an area to which the surface effect is to be applied and the type of the surface effect.

Similarly to the color plane of RGB or CMYK, for example, each pixel in the image data of the gloss-control plane is represented by 8-bits with a density value ranging from "0" to "255". The density values are associated with the types of surface effects (the density values may be represented by 16-bits or 32-bits or by 0 to 100%). The same value is set for areas to which the same surface effect is desired to be applied regardless of the density of the clear toner to be actually attached. Therefore, even if there is no data indicating the areas, the areas can be readily specified from the image data as needed. In other words, the image data of the gloss-control plane indicates the type of a surface effect and the area to which the surface effect is to be applied.

The host device 10 sets the type of a surface effect for a drawn object specified by the user via the image processing application as a density value serving as a gloss-control value for each drawn object, thereby generating image data of the gloss-control plane in a vector format.

Each pixel constituting the image data of the gloss-control plane corresponds to each pixel in the image data of the color plane. The density value of each pixel corresponds to the pixel value in each image data. Both the image data of the color plane and the image data of the gloss-control plane are formed in page units.

Figures 3, 4:
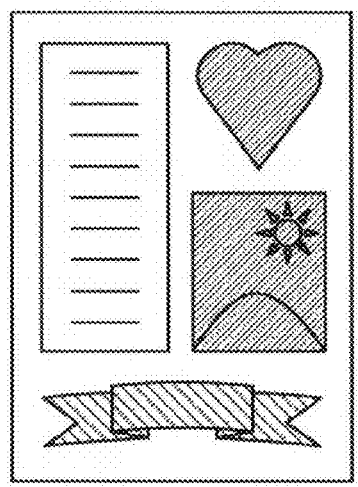
FIG. 3 is an exemplary schematic of the types of surface effects related to the presence of gloss.
FIG. 4 is a schematic illustrating image data of a gloss-control plane as an image.

The types of surface effects are roughly classified into a surface effect related to the presence of gloss, surface protection, a watermark indicating information, and a texture, for example. The surface effects related to the presence of gloss are roughly classified into four as illustrated in FIG. 3. The four types of surface effects are premium gloss (PG), gloss (G), matt (M), and premium matt (PM) in descending order of degrees of gloss (glossiness), for example. Hereinafter, premium gloss, gloss, matt, and premium matt may be referred to as "PG", "G", "M", and "PM", respectively.

Premium gloss and gloss provide a higher gloss, whereas matt and premium matt suppress gloss. In particular, premium matt provides glossiness lower than that of plain paper. In FIG. 3, premium gloss indicates glossiness Gs of equal to or higher than 80, gloss indicates solid glossiness in a primary color or a secondary color, matt indicates glossiness in a primary color and halftone dots of 30%, and premium matt indicates glossiness of equal to or lower than 10. The deviation in the glossiness is represented by ΔGs and is equal to or smaller than 10. For these types of surface effects, a higher density value is associated with a surface effect that provides a higher gloss, whereas a lower density value is associated with a surface effect that suppresses gloss. A density value in the middle thereof is associated with a surface effect, such as a watermark and a texture.

Examples of the watermark may include a character and a background pattern. The texture is formed of characters and patterns and can produce a tactile effect besides a visual effect. A pattern of a stained glass can be formed with the clear toner, for example. Premium gloss and gloss also serve as surface protection. The user specifies the area to which the surface effect is to be applied in an image represented by image data to be processed and the type of the surface effect to be applied to the area via the image processing application. The host device 10 that exerts the image processing application sets a density value corresponding to the surface effect specified by the user for the drawn object corresponding to the area specified by the user, thereby generating image data of the gloss-control plane. The correspondence relation between the density values and the types of surface effects will be described later in detail.

FIG. 4 is a view for explaining an example of the image data of the gloss-control plane. In the example of the image data of the gloss-control plane in FIG. 4, the user applies the surface effect "gloss (G)" to drawing areas of the "heart object" and the "photo object" and applies the surface effect "matt (M)" to a drawing area of a "ribbon object". The density value set for each surface effect is a density value defined correspondingly to the type of each surface effect in a density value selection table (refer to FIG. 9), which will be described later.

Figure 5:
FIG. 5 is a schematic of an example of image data of a clear plane.

The image data of the clear plane is image data specifying a transparent image, such as a watermark and a texture, other than the surface effects described above. FIG. 5 is a view for explaining an example of the image data of the clear plane. In the example of FIG. 5, the user specifies a watermark "Sale".

As described above, the image data of the gloss-control plane and the image data of the clear plane, which are image data of the specific color plane, are generated as planes different from that of the image data of the color plane by the image processing application of the host device 10. The image data of the color plane, the image data of the gloss-control plane, and the image data of the clear plane are generated in a portable document format (PDF). These pieces of image data of the planes in the PDF format are integrated to generate document data. The document data is also generated in the PDF format. The data format of the image data of each plane is not limited to PDF and may be an arbitrary format.

Figure 6:
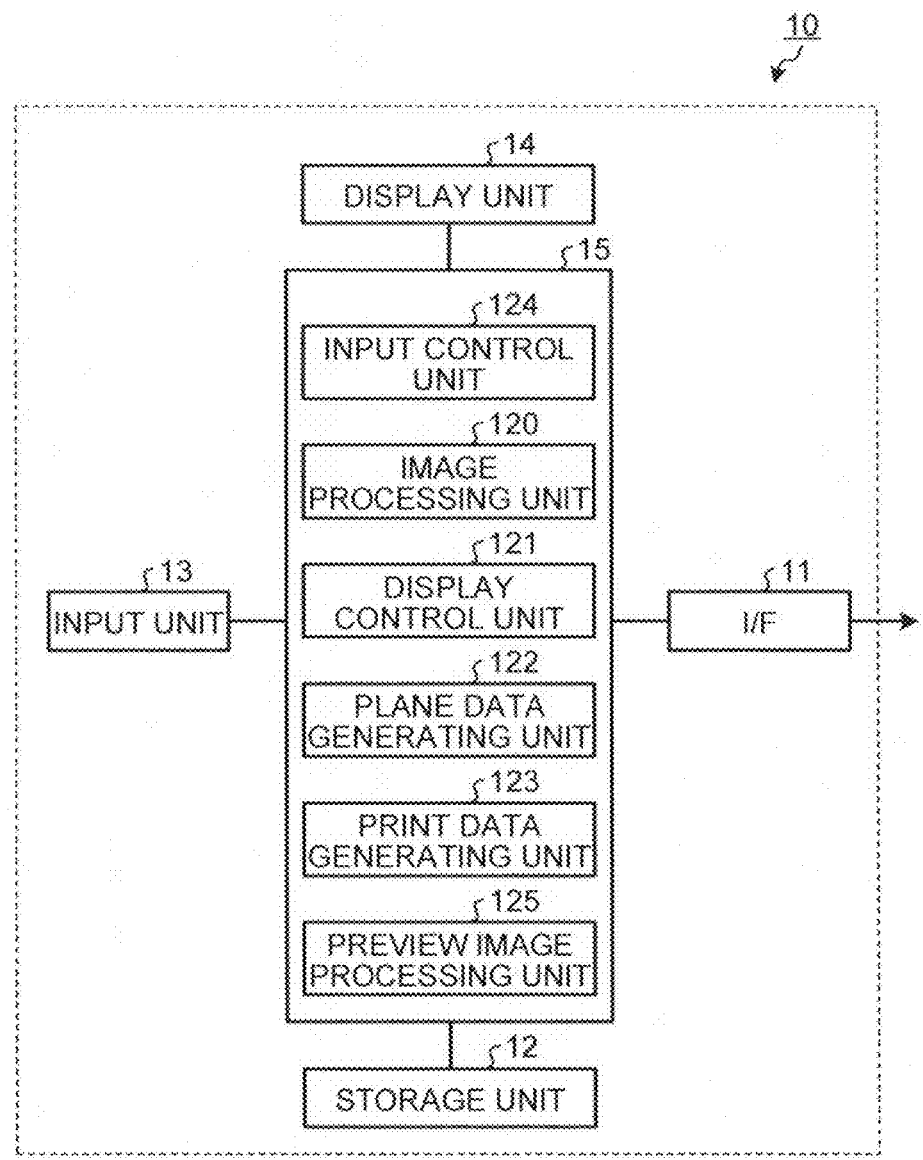
FIG. 6 is a block diagram of an exemplary schematic configuration of a host device.

The host device 10 that generates the image data of each plane will now be described in detail. FIG. 6 is a block diagram of an exemplary schematic configuration of the host device 10. As illustrated in FIG. 6, the host device 10 includes an I/F 11, a storage unit 12, an input unit 13, a display unit 14, and a control unit 15. The I/F 11 is an interface device that communicates with the DFE 50. The storage unit 12 is a storage medium, such as a hard disk drive (HDD) and a memory, that stores therein various types of data. The input unit 13 is an input device through which the user performs various input operations and is formed of a keyboard and a mouse, for example. The display unit 14 is a display device that displays various screens and is formed of a liquid crystal panel, for example.

The control unit 15 is a computer collectively controlling the host device 10 and including a central processing unit (CPU), a read-only memory (ROM), and a random access memory (RAM). As illustrated in FIG. 6, the control unit 15 mainly includes an input control unit 124, the image processing unit 120, a display control unit 121, the plane data generating unit 122, the print data generating unit 123, and a preview image processing unit 125. The input control unit 124 and the display control unit 121 among these units are executed by the CPU of the control unit 15 reading a computer program of an operating system stored in the ROM or the like and loading and executing the computer program on the RAM. The image processing unit 120, the plane data generating unit 122, the print data generating unit 123, and the preview image processing unit 125 are executed by the CPU of the control unit 15 reading a computer program of the image processing application stored in the ROM or the like and loading and executing the computer program on the RAM. The plane data generating unit 122 is provided as a plug-in function installed in the image processing application, for example. At least a part of these units may be executed by an individual circuit (hardware).

The input control unit 124 receives various types of input from the input unit 13 and controls the input. By operating the input unit 13, for example, the user can input image specification information for specifying an image to which a surface effect is to be applied, that is, image data of the color plane (hereinafter, it may be referred to as a "target image") among various images (e.g., photos, characters, figures, and images obtained by synthesizing these elements) stored in the storage unit 12. The method for inputting the image specification information is not limited thereto, and an arbitrary method may be employed.

The display control unit 121 controls display of various types of information on the display unit 14. In the present embodiment, if the input control unit 124 receives image specification information, the display control unit 121 reads an image specified by the image specification information from the storage unit 12 and controls the display unit 14 to display the image thus read on a screen.

By operating the input unit 13 while checking the target image displayed on the display unit 14, the user can input specification information for specifying an area to which a surface effect is to be applied and the type of the surface effect. The method for inputting the specification information is not limited thereto, and an arbitrary method may be employed.

Figure 7:
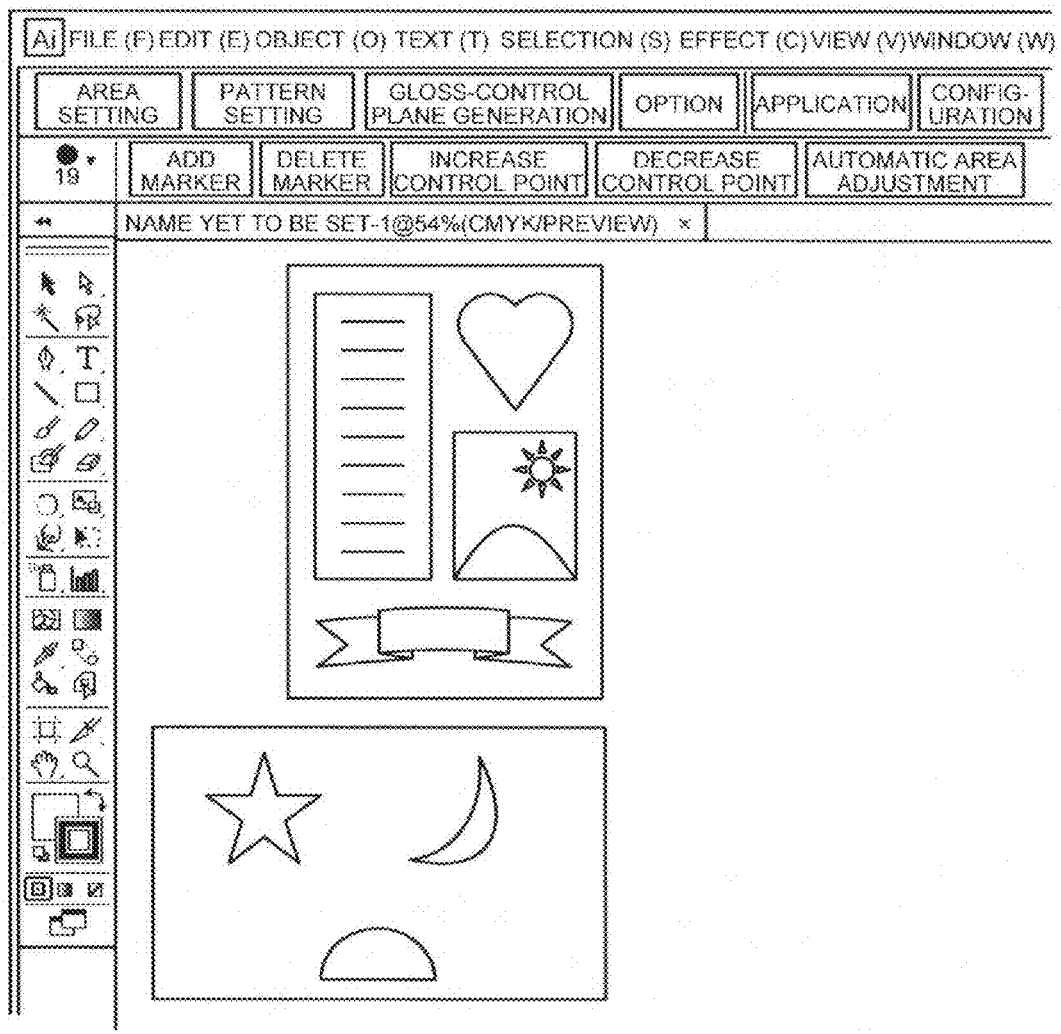
FIG. 7 is a schematic of an exemplary screen displayed by an image processing application.
Figure 8:
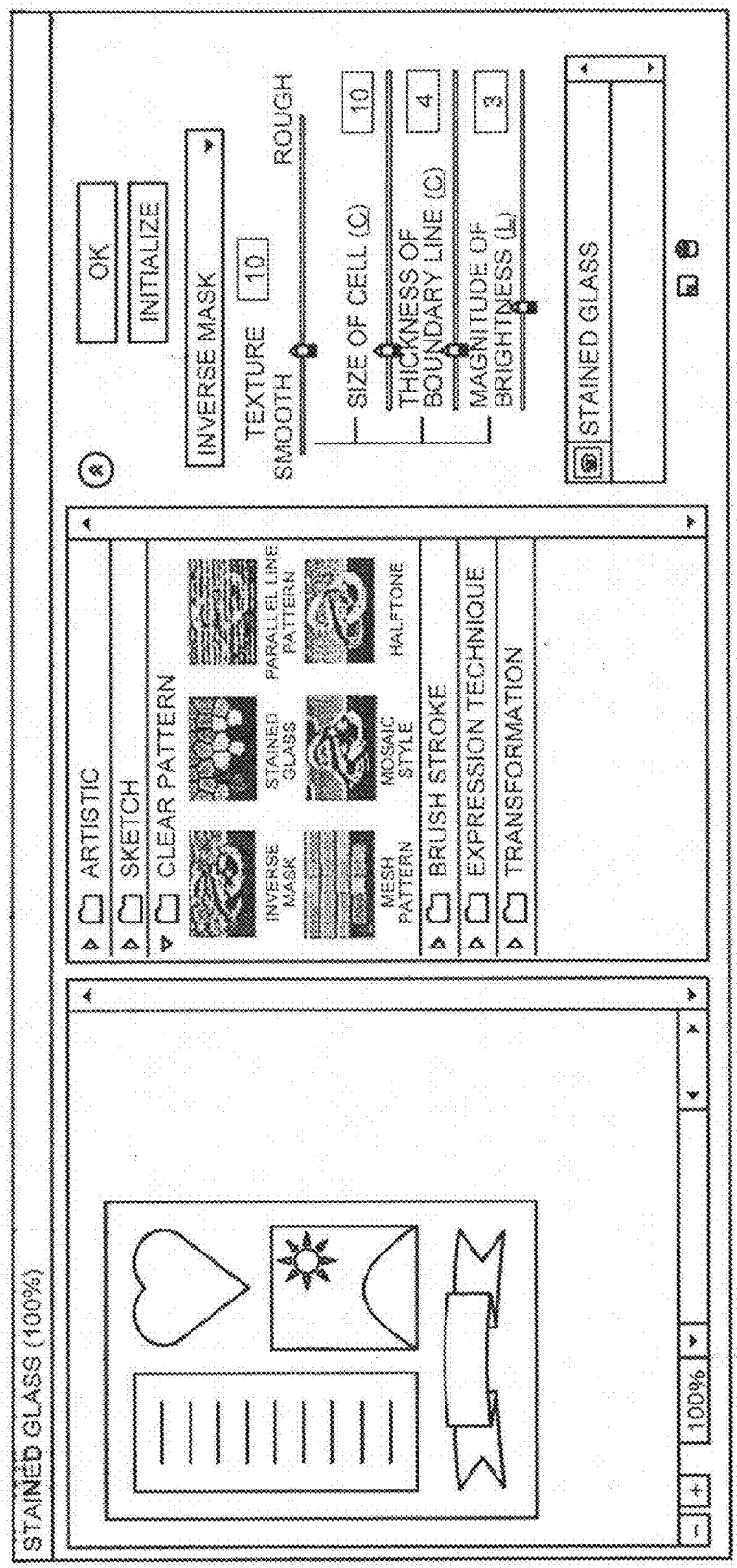
FIG. 8 is a schematic of another exemplary screen displayed by the image processing application.

More specifically, the display control unit 121 causes the display unit 14 to display a screen illustrated in FIG. 7, for example. FIG. 7 is an example of a screen displayed when a plug-in is incorporated into Illustrator marketed by Adobe Systems (R). The screen illustrated in FIG. 7 displays an image represented by target image data (image data of the color plane) to be processed. If the user presses a marker add button through the input unit 13 to perform an input operation for specifying an area to which a surface effect is desired to be applied, the area to which the surface effect is to be applied is specified. The user performs such an input operation on all the areas to which a surface effect is to be applied. The display control unit 121 of the host device 10 then causes the display unit 14 to display a screen illustrated in FIG. 8 for each area thus specified, for example. The screen illustrated in FIG. 8 displays an image of each area specified as an area to which a surface effect is to be applied. If the user performs an input operation for specifying the type of the surface effect desired to be applied to the image through the input unit 13, the type of the surface effect to be applied to the area is specified. The types of surface effects of premium gloss and gloss illustrated in FIG. 3 are denoted as "inverse mask" in FIG. 8. The effects other than premium gloss and gloss illustrated in FIG. 3 are denoted as stained glass, parallel line pattern, mesh pattern, mosaic style, matt, and halftone in FIG. 8. Thus, the screen indicates that each surface effect can be specified.

Referring back to FIG. 6, the image processing unit 120 performs various types of image processing on the target image based on an instruction received from the user through the input unit 13.

The plane data generating unit 122 generates image data of the color plane, image data of the gloss-control plane, and image data of the clear plane. In other words, if the input control unit 124 receives specification of a color made by the user for a drawn object of a target image, the plane data generating unit 122 generates image data of the color plane in accordance with the specification of a color.

If the input control unit 124 receives specification of a transparent image other than a surface effect, such as a watermark and a texture, and an area in which the transparent image is to be formed, the plane data generating unit 122 generates image data of the clear plane for specifying the transparent image and an area in which the transparent image is to be formed on a sheet in accordance with the specification made by the user.

If the input control unit 124 receives specification information (an area to which a surface effect is to be applied and the type of the surface effect), the plane data generating unit 122 generates image data of the gloss-control plane capable of specifying the area to which the surface effect is to be applied on a sheet and the type of the surface effect based on the specification information. The plane data generating unit 122 generates image data of the gloss-control plane for specifying the area to which the surface effect represented by a gloss-control value is to be applied in units of drawn objects of image data of the target image.

The storage unit 12 stores therein the density value selection table storing therein the type of a surface effect specified by the user and the density value of the gloss-control plane corresponding to the type of the surface effect. FIG. 9 is a schematic of an example of the density value selection table. In the example illustrated in FIG. 9, the density value of the gloss-control plane corresponding to an area for which the surface effect "PG" (premium gloss) is specified by the user as the clear processing is "98%", the density value of the gloss-control plane corresponding to an area for which "G" (gloss) is specified is "90%", the density value of the gloss-control plane corresponding to an area for which "M"(matt) is specified is "16%", and the density value of the gloss-control plane corresponding to an area for which "PM" (premium matt) is specified is "6%".

The density value selection table is a part of data of a surface effect selection table (described later) stored in the DFE 50. The control unit 15 acquires the surface effect selection table at a predetermined timing to generate the density value selection table from the surface effect selection table thus acquired and stores the density value selection table in the storage unit 12. The surface effect selection table may be stored in a storage server (cloud) on a network, such as the Internet. In this case, the control unit 15 acquires the surface effect selection table from the server and generates the density value selection table from the surface effect selection table thus acquired. The surface effect selection table stored in the DFE 50 needs to be the same as the surface effect selection table stored in the storage unit 12.

Referring back to FIG. 6, the plane data generating unit 122 sets the density value (gloss-control value) of a drawn object for which a certain surface effect is specified by the user to a value corresponding to the type of the surface effect while referring to the density value selection table illustrated in FIG. 9, thereby generating image data of the gloss-control plane. An assumption is made that the user determines to apply "G" to the heart object (a drawing area of a heart) and the photo object (a drawing area of a photo) and apply "M" to the ribbon object (a drawing area of a ribbon) arranged at the lower part of the image data of the color plane among the target images serving as the image data of the color plane illustrated in FIG. 2. In this case, the plane data generating unit 122 sets the density value of the drawing area for which "G" is specified by the user (the heart object and the photo object) to "90%" and the density value of the drawing area for which "M" is specified (the ribbon object) to "16%", thereby generating image data of the gloss-control plane. The image data of the gloss-control plane generated by the plane data generating unit 122 is data in a vector format expressed as a set of drawn objects indicating coordinates of points, parameters of equations of lines and planes connecting the points, fill, and special effects, for example. FIG. 4 is a schematic illustrating the image data of the gloss-control plane as an image. The plane data generating unit 122 generates document data by integrating the image data of the gloss-control plane, the image data of the target image (image data of the color plane), and the image data of the clear plane and transfers the document data to the print data generating unit 123.

Figure 10:
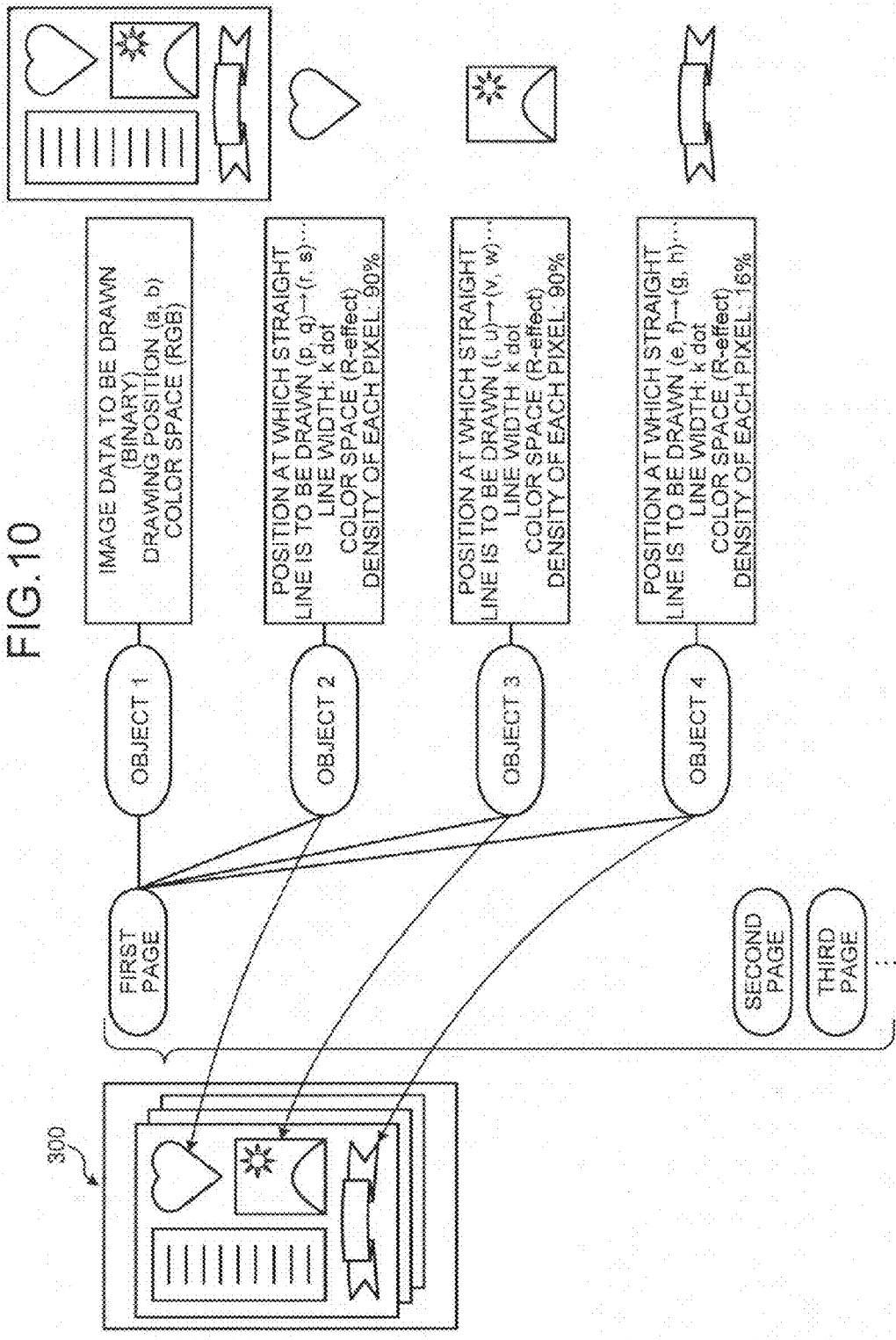
FIG. 10 is a schematic of document data generated by a print data generating unit.

FIG. 10 is a schematic of document data 300 generated by the print data generating unit 123. Document data includes drawing information indicating a plurality of drawing areas (objects) in a single page. In the example of the document data illustrated in FIG. 10, four objects of an object 1 to an object 4 are specified as targets for the clear processing on the first page. Each object is specified by the image data of the color plane and the image data of the gloss-control plane.

In the example of FIG. 10, the object 1 is a drawing area of a color image specified by the image data of the color plane. In other words, the object 1 is an area whose image is specified to be formed on a corresponding recording medium with a color toner (a color developer) by the image data of the color plane. The object 2 to the object 4 are drawing areas specified by the image data of gloss-control plane. In other words, the object 2 to the object 4 are subjected to clear processing corresponding to the image data of the gloss-control plane and are areas whose images are specified to be formed on the corresponding recording medium with a clear toner by the image data of the gloss-control plane.

The document data includes information indicating the position, the color space, and the density of a drawing area for each object as drawing information. The position of a drawing area is represented by coordinate information or a set of pieces of coordinate information, for example. The color space indicates whether each drawing area (object) is a color image, a transparent image, or a gloss area. In FIG. 10 and figures described later, a transparent image may be denoted as R-clear, a gloss area may be denoted as R-effect, and a color image may be denoted as RGB. An explanation will be made of the case where a density value (0 to 100%) is set as the density of each object.

In the example illustrated in FIG. 10, a group of drawing areas of color images specified by the image data of the color plane is considered as one object (drawing area). Furthermore, in the example of FIG. 10, the document data includes no object specified by the image data of the clear plane. If there is an object specified by image data of the clear plane, the document data includes the object specified by the image data of the clear plane.

Figure 11:
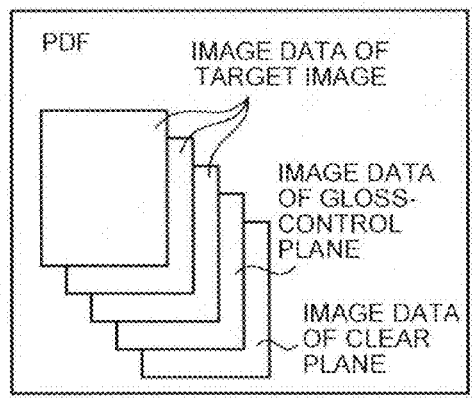
FIG. 11 is a conceptual schematic of an exemplary structure of print data.

The print data generating unit 123 generates print data based on the document data. The print data includes the image data of the target image (image data of the color plane), the image data of the gloss-control plane, the image data of the clear plane, and a job command, such as setting of a printer, setting for intensive printing, and setting for duplex printing, issued to the printer. FIG. 11 is a conceptual schematic of an exemplary structure of the print data. While job definition format (JDF) is used as a job command in the example of FIG. 11, the job command is not limited thereto. The JDF illustrated in FIG. 11 is a command for specifying "single-sided printing and stapling" as the setting for intensive printing. The print data may be converted into a page description language (PDL), such as PostScript, or may remain in the PDF as long as the DFE 50 is compatible with the PDF.

The preview image processing unit 125 generates a preview image of the document data. The preview image is an image that shows a print result obtained by performing clear processing, such as a gloss effect, specified by the user on the document data. The preview image is displayed on the display unit 14 via the display control unit 121. By checking the preview image displayed on the display unit 14, the user can check the appearance of a printed material of the document data on which processing, such as a surface effect, is performed before printing.

Figure 12:
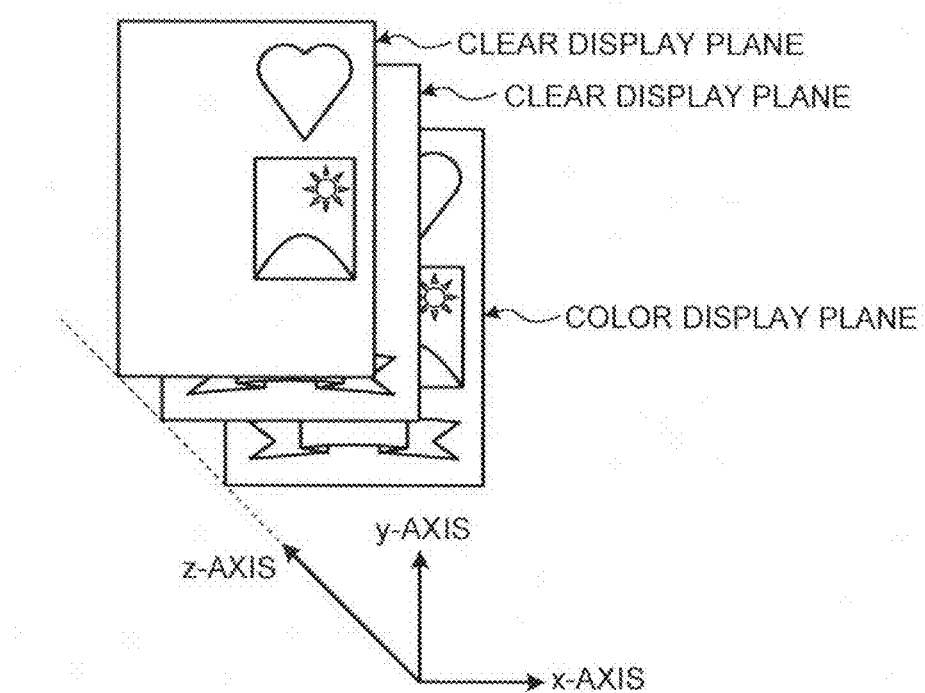
FIG. 12 is a schematic of an example of a preview image.

FIG. 12 is a schematic of an example of the preview image. As illustrated in FIG. 12, the preview image processing unit 125 generates a preview image by projecting a three-dimensional model formed of a color display plane and a plurality of clear display planes arranged in a three-dimensional space onto a two-dimensional plane. The color display plane displays image data that shows a print result of the image data of the color plane. The clear display plane displays image data that shows a print result of the image data on which the clear processing is performed. In the three-dimensional model, a horizontal direction of a display screen serving as the display unit 14 is an x-axis, a vertical direction thereof is a y-axis, and a direction perpendicular to the display screen is a z-axis. The color display plane and the clear display planes are arranged along the z-axis direction at different positions in the z-axis direction. The positions of the color display plane and the clear display planes in the x-axis direction and the y-axis direction coincide with one another.

The preview image processing unit 125 generates clear display planes equal in number to the number of types of clear processing specified in the document data and generates a preview image including all the clear display planes thus generated. In other words, the number of clear display planes included in the preview image is determined by the number of types of clear processing specified by the user. Thus, while the preview image illustrated in FIG. 12 includes two clear display planes, the number of clear display planes is not limited thereto.

Figure 13:
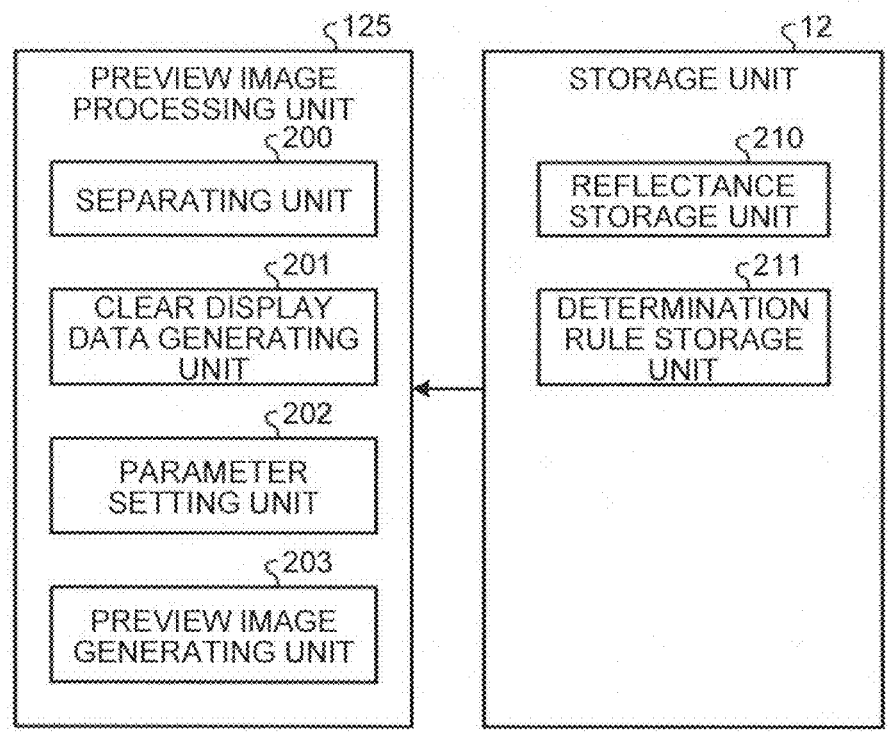
FIG. 13 is a block diagram illustrating a functional configuration of a preview image processing unit in detail.

FIG. 13 is a block diagram illustrating a functional configuration of the preview image processing unit 125 of FIG. 6 in detail. The preview image processing unit 125 includes a separating unit 200, a clear display data generating unit 201, a parameter setting unit 202, and a preview image generating unit 203. The preview image generating unit 203 is executed by open graphics library (open GL), for example. The storage unit 12 includes a reflectance storage unit 210 and a determination rule storage unit 211. The preview image processing unit 125 refers to the reflectance storage unit 210 and the determination rule storage unit 211.

The separating unit 200 acquires document data from the plane data generating unit 122. The separating unit 200 then extracts a group of objects expressed by the image data of the gloss-control plane and the image data of the clear plane included in the document data. Thus, the separating unit 200 separates the document data into the image data of the color plane corresponding to the target image serving as a target to be formed as an image and data for the clear toner expressed by the image data of the gloss-control plane and the image data of the clear plane.

The data for the clear toner is image data in a raster format obtained by mapping density values (0 to 100%) included in the image data of the gloss-control plane and the image data of the clear plane to 8-bit pixel values (0 to 255). In other words, each pixel value of the image data serving as the data for the clear toner corresponds to a density value. The density value is associated with the type of clear processing in the density value selection table explained with reference to FIG. 9. Therefore, by referring to the pixel value of the image data, it is possible to specify the clear processing to be performed on the pixel value.

The clear display data generating unit 201 generates clear display data based on the image data of the color plane and the data for the clear toner obtained by the separating unit 200. The clear display data is data to be drawn on the clear display plane included in the preview image. The clear display data includes data indicating a drawing area on which predetermined clear processing is to be performed and data indicating the type of the clear processing to be performed. The clear display data generating unit 201 generates a plurality of pieces of clear display data corresponding to the respective types of clear processing included in the document data. The pieces of clear display data are drawn on a plurality of different clear display planes.

The types of clear processing are roughly classified into surface effect processing for applying a surface effect corresponding to image data of the gloss-control plane and clear image generation for generating a transparent image (a clear image) corresponding to image data of the clear plane. The surface effect processing is further classified into four types of processing illustrated in FIG. 3, and the four types of processing are determined to be different types of processing. The four types of processing illustrated in FIG. 3 have densities different from one another, and the types of processing having different densities are determined to be different types of processing. In other words, in the surface effect processing, surface effects having the same density are determined to be the same surface effect processing, whereas surface effects having different densities are determined to be different types of surface effect processing.

The clear display data includes a type name of clear processing, image data of the color plane, and alpha channel data. The alpha channel data is binary data indicating whether clear processing is specified for each drawing area in pixel units. Specifically, pixels for which clear processing is specified are assigned a value of nonzero, whereas pixels for which no clear processing is specified are assigned a value of zero in the alpha channel data.

The alpha channel data is applied to the image data of the color plane. As a result, image data of the color plane corresponding to a pixel assigned a value of zero in the alpha channel data is made transparent. In other words, the image data of the color plane corresponding to the pixel assigned a value of zero in the alpha channel data is not displayed. By contrast, image data of the color plane corresponding to a pixel assigned a value of nonzero in the alpha channel data is not made transparent. In other words, the image data of the color plane corresponding to the pixel is displayed.

Figure 14:
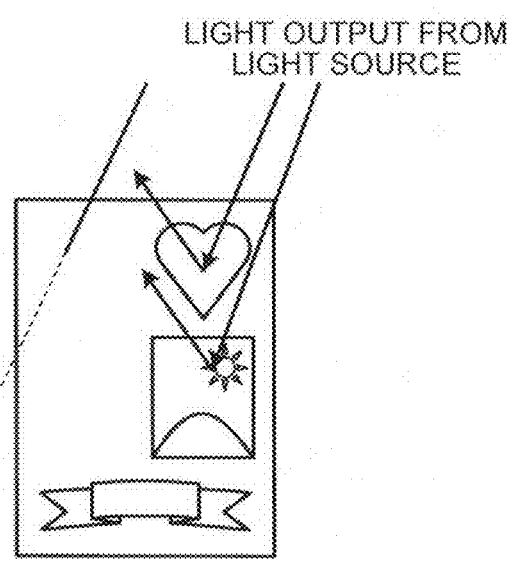
FIG. 14 is a schematic of an example of alpha channel data.

FIG. 14 is a schematic of an example of the alpha channel data. In the alpha channel data of FIG. 14, the heart object and the photo object are assigned a value of nonzero, and areas other than these objects are assigned a value of zero. In this case, as illustrated in FIG. 14, light output from a light source is reflected by the heart object and the photo object, whereas the light passes through the area other than these objects.

Figure 15:
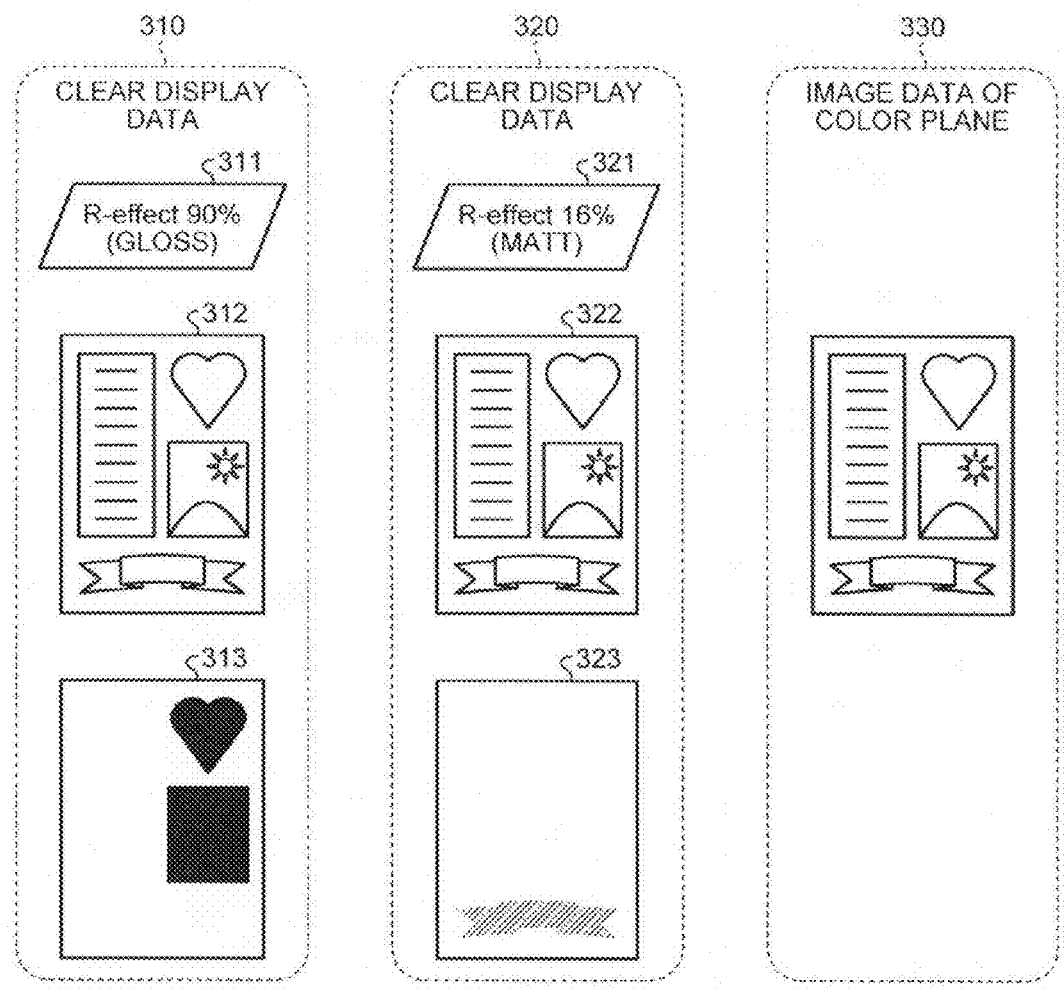
FIG. 15 is a schematic of an example of clear display data.

FIG. 15 is a schematic of an example of the clear display data. FIG. 15 illustrates image data of the color plane 330 and clear display data 310 and clear display data 320 generated correspondingly to the image data of the color plane 330.

The clear display data 310 includes a type name of clear processing 311, image data of the color plane 312, and alpha channel data 313. The type name of clear processing 311 indicates R-effect 90%, that is, the surface effect of gloss with a density of 90%. In the alpha channel data 313, the drawing area of the heart object and the drawing area of the photo object are assigned a value of nonzero as drawing areas for which the surface effect indicated in the type name of clear processing 311, that is, the surface effect of gloss with a density of 90% is specified. Pixels other than these areas are assigned a value of zero.

The clear display data 320 includes a type name of clear processing 321, image data of the color plane 322, and alpha channel data 323. The type name of clear processing 321 indicates R-effect 16%, that is, the surface effect of matt with a density of 16%. In the alpha channel data 323, the drawing area of the ribbon object is assigned a value of nonzero as a drawing area for which the surface effect of matt with a density of 16% indicated in the type name of clear processing 321 is specified, and pixels other than the area is assigned a value of zero. Both the image data of the color plane 312 and the image data of the color plane 322 are the same as the image data of the color plane 330.

Referring back to FIG. 13, the parameter setting unit 202 transmits parameters for generating a preview image to the preview image generating unit 203 based on the pieces of clear display data generated by the clear display data generating unit 201 and the image data of the color plane obtained by the separating unit 200.

The parameters include normal vectors of the color display plane that displays the image data of the color plane and of each of the clear display planes that displays each piece of clear display data explained with reference to FIG. 12, reflectance of light of these display planes, and arrangement positions of these display planes.

The normal vector is information defined by the color display plane and the clear display planes. The arrangement position is an arrangement position in the predetermined three-dimensional space explained with reference to FIG. 12. The position in the x-axis direction and the arrangement position in the y-axis direction are set in advance in the parameter setting unit 202. The arrangement position in the z-axis direction is determined by the parameter setting unit 202 based on the type of clear processing corresponding to the clear display data generated by the clear display data generating unit 201 and on the number of pieces of clear display data.

The parameter setting unit 202 determines the arrangement position of each display plane in the z-axis direction based on a determination rule stored in the determination rule storage unit 211 in the storage unit 12. The determination rule is a rule used for determining the arrangement positions of the color display plane and the clear display planes in the z-axis direction.

The determination rule will now be described with reference to FIG. 16. The determination rule determines the arrangement position of the color display plane in the z-axis direction to be a first position. The first position is a fixed value. The determination rule determines the arrangement position of the clear display plane to be a position closer to an observer who observes the display screen than the first position in the z-axis direction. Furthermore, the determination rule determines the arrangement positions of the clear display planes in the z-axis direction based on the types of clear processing. Specifically, the determination rule determines the arrangement position of a clear display plane having a higher density of the surface effect to be a position closer to the observer in the z-axis direction.

Furthermore, the determination rule determines the arrangement position of the clear display plane on which the clear display data corresponding to the clear image corresponding to the image data of the clear plane is drawn to be the position closest to the observer. The determination rule determines a gap between the display planes to be a predetermined certain value. Alternatively, the determination rule may determine the gap between the display planes based on the density values, for example.

Figures 16, 17:
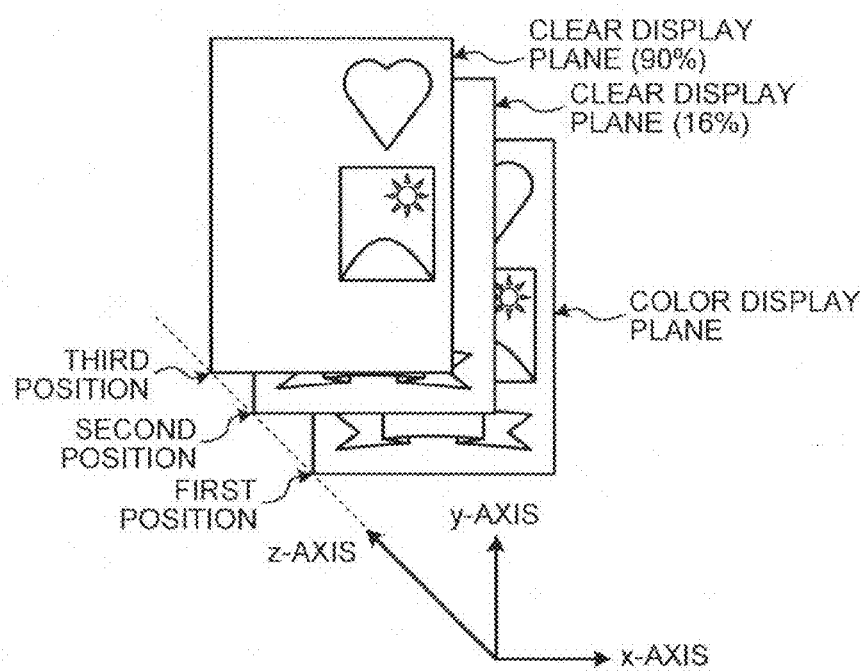
FIG. 16 is a view for explaining a determination rule.
FIG. 17 is a schematic of a data structure of a reflectance storage unit.

In the example of FIG. 16, the arrangement position of the color display plane is determined to be the first position in accordance with the determination rule.

Subsequently, the arrangement position of the clear display plane having a lower density of 16% is determined to be a second position, which is a position closer to the observer than the first position. The second position is closer to the observer than the first position by the certain gap. Furthermore, the arrangement position of the clear display plane having a higher density of 90% is determined to be a third position, which is a position closer to the observer than the second position by the certain gap.

The reflectance of light is a value indicating the degree of reflectance of light output to the color display plane and the clear display planes. The reflectance of light is specified by the parameter setting unit 202 by referring to the reflectance storage unit 210 stored in the storage unit 12. FIG. 17 is a schematic of a data structure of the reflectance storage unit 210. The reflectance storage unit 210 stores therein the type of clear processing and the reflectance of light in a manner associated with each other. The reflectance storage unit 210 further stores therein specular reflectance, diffuse reflectance, and environmental reflectance as the reflectance. Each reflectance is set in advance for each type of clear processing. The reflectance storage unit 210 further stores therein the reflectance of light of the image data of the color plane.

As a result, the parameter setting unit 202 can refer to the reflectance storage unit 210 to specify the reflectance of the clear display data based on the type of clear processing of the clear display data. Furthermore, the parameter setting unit 202 can refer to the reflectance storage unit 210 to specify the reflectance of the image data of the color plane.

The reflectance storage unit 210 according to the present embodiment stores therein four types of clear processing of premium gloss (PG), gloss (G), matt (M), and premium matt (PM) alone. While the four types of clear processing include different types of clear processing for each density, the reflectance storage unit 210 associates each clear processing set as a type of clear processing with certain reflectance regardless of its density. This is because, even if the reflectance of light is changed precisely depending on the density to display a three-dimensional image on a display, the difference cannot be large enough to be recognized.

Referring back to FIG. 13, the preview image generating unit 203 uses the parameters received from the parameter setting unit 202 to generate a preview image by projecting a three-dimensional model formed of the color display plane and the clear display planes arranged in a three-dimensional space onto a two-dimensional plane. The preview image generated by the preview image generating unit 203 is displayed on the display screen serving as the display unit 14 via the display control unit 121 explained with reference to FIG. 6.

Specifically, the preview image generating unit 203 edits the image data of the color plane based on the reflectance received from the parameter setting unit 202 for the image data of the color plane and draws the image data of the color plane thus edited on the color display plane. Furthermore, the preview image generating unit 203 edits the pieces of clear display data based on the reflectance received from the parameter setting unit 202 for the pieces of clear display data and draws the pieces of clear display data thus edited on the respective clear display planes different from one another.

The preview image generating unit 203 then arranges the color display plane and the clear display planes on which the pieces of data are drawn in the three-dimensional space based on the normal parameters and the arrangement positions of the display planes. In other words, the preview image generating unit 203 arranges the color display plane at a predetermined position in the three-dimensional space. The preview image generating unit 203 then arranges a first clear display plane having the lowest density at a position closer to the observer than the color display plane on the z-axis. Furthermore, the preview image generating unit 203 arranges a second clear display plane having the second lowest density at a position closer to the observer than the first clear display plane thus arranged. In other words, the clear display planes are arranged at different positions in the z-axis direction. The preview image generating unit 203 generates a preview image by projecting the three-dimensional model thus generated onto the two-dimensional plane.

In other words, the preview image is formed of the color display plane arranged at the predetermined position and the clear display planes superimposed on the color display plane.

In the preview image, the clear display planes are superimposed in density order and are arranged at different positions also on the two-dimensional plane correspondingly to the positions on the z-axis.

Figure 18:
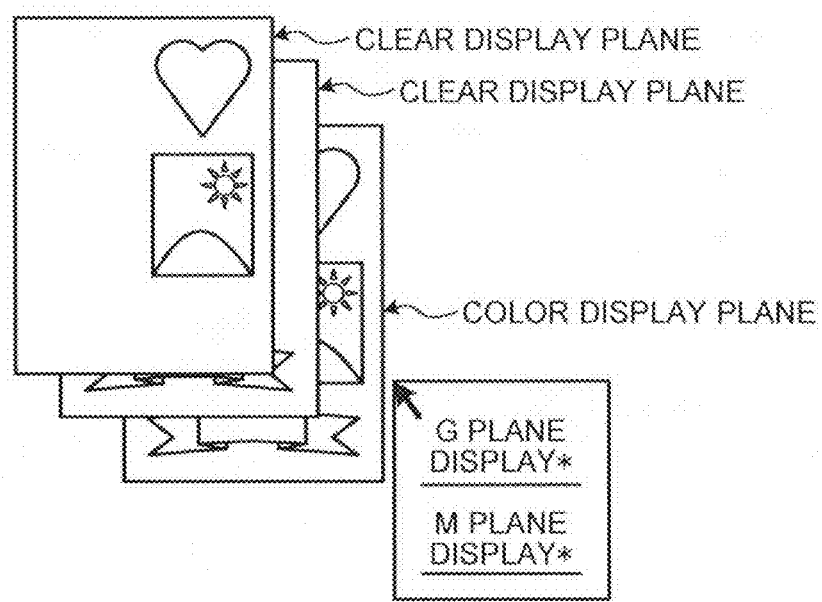
FIG. 18 is a schematic of a preview image.

FIG. 18 is a schematic of the preview image displayed on the display unit 14. If the input control unit 124 serving as a receiving unit receives a command of clicking the right button of the mouse serving the input unit 13, for example, the display control unit 121 displays a check box illustrated in FIG. 18 together with the preview image.

If the user takes a check button "*" displayed for each clear display plane off the check box with a user interface, the input control unit 124 receives a non-display command, and the display control unit 121 hides a clear display plane corresponding to the check button. By contrast, if the check button is not being displayed and the user reselects the check button, the input control unit 124 receives a display command, and the display control unit 121 switches the state of the clear display plane corresponding to the check box from the hidden state to the displayed state.

An explanation will be made of a process for generating print data performed by the host device 10 configured as described above. FIG. 19 is a flowchart of a procedure for generating print data performed by the host device 10 according to the present embodiment. In the example of the processing below, no transparent image is specified, that is, no image data of the clear plane is generated.

If the input control unit 124 receives input of image specification information (Yes at Step S11), the display control unit 121 controls the display unit 14 to display an image specified by the image specification information thus received (Step S12). Subsequently, if the input control unit 124 receives input of specification information of a surface effect (Yes at Step S13), the plane data generating unit 122 generates image data of the gloss-control plane based on the specification information thus received (Step S14).

The process for generating the image data of the gloss-control plane at Step S14 will now be described in detail. FIG. 20 is a flowchart of the procedure for generating the image data of the gloss-control plane. The plane data generating unit 122 specifies a drawn object in a target image to which the surface effect is applied by the specification information and coordinates of the drawn object (Step S31). The drawn object and the coordinates thereof are specified by a drawing command supplied from the operating system when the image processing unit 120 draws the drawn object in the target image and by a coordinate value set in the drawing command, for example.

The plane data generating unit 122 then refers to the density value selection table stored in the storage unit 12 to determine the density value serving as the gloss-control value corresponding to the surface effect applied by the user with the specification information (Step S32).

The plane data generating unit 122 then registers the drawn object and the density value determined correspondingly to the surface effect in image data of the gloss-control plane (initially, which is null data) in a manner associated with each other (Step S33).

Subsequently, the plane data generating unit 122 determines whether the processes from Step S31 to Step S33 are completed for all the drawn objects in the target image (Step S34). If the processes are not completed yet (No at Step S34), the plane data generating unit 122 selects an yet-to-be-processed drawn object in the target image (Step S35) and performs the processes from Step S31 to Step S33 again.

If it is determined that the processes from Step S31 to Step S33 are completed for all the drawn objects in the target image at Step S34 (Yes at Step S34), the plane data generating unit 122 finishes the generation of the gloss-control plane. Thus, the image data of the gloss-control plane illustrated in FIG. 4 is generated. FIG. 21 is a schematic of correspondence relation among drawn objects, coordinates, and density values in the image data of the gloss-control plane illustrated in FIG. 4.

Referring back to FIG. 19, if the image data of the gloss-control plane is generated, the plane data generating unit 122 integrates the image data of the gloss-control plane and the image data of the target image to generate document data and transmits the document data to the print data generating unit 123. The print data generating unit 123 generates print data based on the document data (Step S15). Thus, the print data is generated.

FIG. 22 is a flowchart of a procedure for generating a preview image performed by the preview image processing unit 125. The separating unit 200 acquires document data from the plane data generating unit 122. The separating unit 200 then extracts a group of objects in the image data of the gloss-control plane and the image data of the clear plane, thereby separating the document data into the image data of the color plane and the data for the clear toner (Step S100). Subsequently, the clear display data generating unit 201 generates clear display data based on the image data of the color plane and the data for the clear toner (Step S101).

Figure 23:
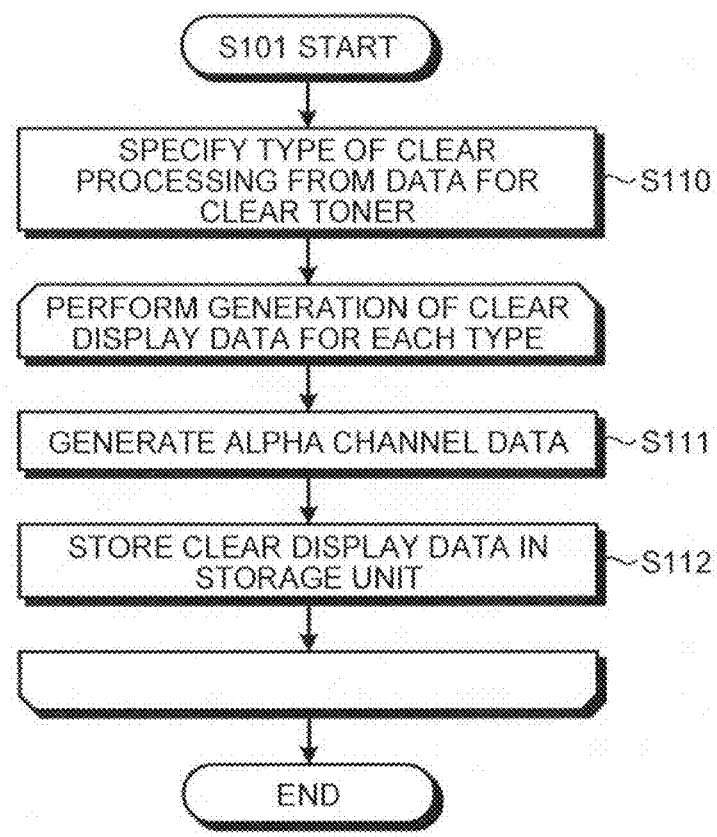
FIG. 23 is a flowchart of a procedure for generating clear display data.

FIG. 23 is a flowchart of a procedure for generating the clear display data. The clear display data generating unit 201 specifies a plurality of types of clear processing included in the data for the clear toner (Step S110). The clear display data generating unit 201 then generates alpha channel data corresponding to predetermined types of clear processing (Step S111). Subsequently, the clear display data generating unit 201 generates clear display data including the name of clear processing, the alpha channel data, and the image data of the color plane and stores the clear display data thus generated in the storage unit 12 (Step S112).

By performing the routine processes of Step S111 and Step S112 on all the clear processing specified at Step S110, the clear display data generating unit 201 generates clear display data corresponding to all the clear processing. Subsequently, the clear display data generating unit 201 stores the clear display data in the storage unit 12, and the generation of clear display data is completed.

Referring back to FIG. 22, if the generation of the clear display data is completed (Step S101), the parameter setting unit 202 transmits the normal vector of the color display plane on which the image data of the color plane is drawn to the preview image generating unit 203. The parameter setting unit 202 further transmits the normal vectors of the clear display planes on which the pieces of clear display data generated in the generation of clear display data (Step S101) are drawn to the preview image generating unit 203 (Step S102).

In accordance with the determination rule stored in the determination rule storage unit 211, the parameter setting unit 202 determines the arrangement position of each of the display planes in the three-dimensional space and transmits the arrangement position to the preview image generating unit 203 (Step S103). The parameter setting unit 202 refers to the reflectance storage unit 210 to specify the reflectance of the color display plane. Furthermore, the parameter setting unit 202 specifies the reflectance of each of the clear display planes based on the type of clear processing included in the clear display data drawn on the clear display plane. The parameter setting unit 202 then transmits the reflectance of each of the display planes thus specified to the preview image generating unit 203 (Step S104).

The order of transmitting the parameters to the preview image generating unit 203 is not limited to that in the present embodiment. Alternatively, the parameter setting unit 202 may perform routine process for specifying the normal vector, the arrangement position, and the reflectance for each of the display planes and transmitting these parameters to the preview image generating unit 203, for example.

Subsequently, the preview image generating unit 203 generates a preview image based on the parameters acquired from Step S102 to Step S104 (Step S105). Thus, the generation of a preview image is completed.

As described above, the image forming system 1 according to the present embodiment can generate a preview image serving as a three-dimensional image. The preview image is generated by projecting the three-dimensional model formed of the color display plane and the clear display planes onto the two-dimensional plane. The color display plane on which the image data of the color plane is drawn is arranged at a position farthest from the observer in the z-axis direction, whereas the clear display planes are arranged at positions closer to the observer.

Therefore, the checker of the preview image can readily know the image of the target image to be printed and the image of the print result on which the clear processing is performed.

The clear display plane is generated for each type of clear processing. In the preview image, the clear display planes thus generated display the objects to be subjected to the respective types of clear processing and are arranged at different positions on the z-axis. Therefore, the checker of the print result can readily know the print result of each type of clear processing with the clear toner.

Figure 24:
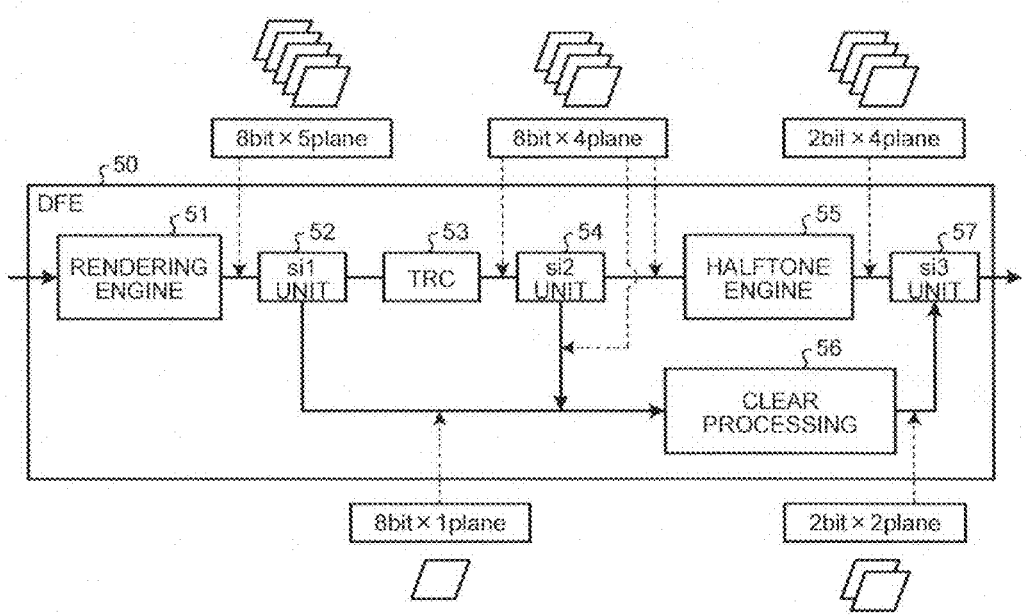
FIG. 24 is an exemplary block diagram of a functional configuration of a DFE.

The functional configuration of the DFE 50 will now be described. As illustrated in FIG. 24, the DFE 50 includes a rendering engine 51, an si1 unit 52, a tone reproduction curve (TRC) 53, an si2 unit 54, a halftone engine 55, a clear processing 56, an si3 unit 57, and a surface effect selection table (not illustrated). The rendering engine 51, the si1 unit 52, the TRC 53, the si2 unit 54, the halftone engine 55, the clear processing 56, and the si3 unit 57 are executed by a control unit of the DFE 50 executing various computer programs stored in a main memory or an auxiliary memory. The si1 unit 52, the si2 unit 54, and the si3 unit 57 have a function to separate image data and a function to integrate image data. The surface effect selection table is stored in the auxiliary memory, for example.

The rendering engine 51 receives image data (e.g., the print data illustrated in FIG. 11) from the host device 10. The rendering engine 51 interprets the language of the image data thus received to convert the image data expressed in a vector format into image data expressed in a raster format and converts a color space expressed in an RGB format or the like into a color space in a CMYK format. As a result, the rendering engine 51 outputs pieces of 8-bit image data of CMYK color planes and an 8-bit gloss-control plane. The si1 unit 52 outputs the pieces of 8-bit image data of CMYK to the TRC 53 and outputs the 8-bit gloss-control plane to the clear processing 56. The DFE 50 converts image data of the gloss-control plane in a vector format received from the host device 10 into image data in a raster format. As a result, the DFE 50 sets the type of a surface effect for the drawn object specified by the user with the image processing application as a density value in pixel units, thereby outputting image data of the gloss-control plane.

The TRC 53 receives the pieces of 8-bit image data of CMYK via the si1 unit 52. The TRC 53 performs gamma correction on the image data thus received using a gamma curve of 1D_LUT generated by calibration. Examples of the data processing include control on the total amount of toner besides the gamma correction. The total amount control is to limit the pieces of 8-bit image data of CMYK on which the gamma correction is performed for the reason of limits on the amount of toner capable of being supplied by the printer device 70 to one pixel on a recording medium. If an image is printed in disregard of the total amount control, the image quality deteriorates because of poor transfer and poor fixing. In the present embodiment, however, the explanation is made of the related gamma correction alone.

The si2 unit 54 outputs the pieces of 8-bit image data of CMYK on which the gamma correction is performed by the TRC 53 to the clear processing 56 as data used for generating an inverse mask (which will be described later). The halftone engine 55 receives the pieces of 8-bit image data of CMYK on which the gamma correction is performed via the si2 unit 54. To output the pieces of image data thus received to the printer device 70, the halftone engine 55 performs halftone processing for converting the pieces of image data into pieces of 2-bit image data of CMYK, for example, and outputs the pieces of 2-bit image data of CMYK obtained by performing the halftone processing. The 2-bit data format is given just as an example, and the data format is not limited thereto.

The clear processing 56 receives the 8-bit gloss-control plane converted by the rendering engine 51 via the si1 unit 52 and receives the pieces of 8-bit image data of CMYK on which the gamma correction is performed by the TRC 53 via the si2 unit 54. The clear processing 56 uses the gloss-control plane thus received and refers to the surface effect selection table, which will be described later, thereby determining the surface effect corresponding to the density value (pixel value) of each pixel constituting the gloss-control plane. In accordance with the determination, the clear processing 56 determines whether to turn ON or OFF the glosser 80. In addition, the clear processing 56 uses the pieces of 8-bit image data of CMYK thus received to generate an inverse mask or a solid mask as appropriate, thereby generating 2-bit image data of the clear-toner plane to which the clear toner is to be attached as appropriate. Based on the result of determination of the surface effect, the clear processing 56 generates and outputs image data of the clear-toner plane used in the printer device 70 and image data of the clear-toner plane used in the low-temperature fixing unit 90 as appropriate. In addition, the clear processing 56 outputs ON-OFF information indicating "ON" or "OFF" of the glosser 80.

Herein, the inverse mask makes the total amount of the attached CMYK toners and the attached clear toner uniform on pixels constituting a target area to which the surface effect is to be applied. Specifically, the inverse mask is generated by adding all the density values of the pixels constituting the target area in the image data of the CMYK plane and subtracting the value thus added from a predetermined value. An inverse mask 1, for example, is expressed by Equation (1):

$$Clr = 100 - (C + M + Y + K) \quad (1)$$

in the case of Clr<0, Clr=0 is satisfied.

In Equation (1), Clr, C, M, Y, and K represent the density rate converted from the density value of each pixel for the clear toner and each toner of C, M, Y, and K, respectively. In other words, by using Equation (1), the total amount of attached toners obtained by adding the amount of the attached clear toner to the total amount of the attached toners of C, M, Y, and K is made 100% for all the pixels constituting the target area to which the surface effect is to be applied. If the total amount of the attached toners of C, M, Y, and K is equal to or larger than 100%, no clear toner is attached to make the density rate of the clear toner 0%. This is because the part having the total amount of the attached toners of C, M, Y, and K exceeding 100% is made smooth by fixing process. By making the total amount of the attached toner on all the pixels constituting the target area to which the surface effect is to be applied equal to or larger than 100% in this manner, it is possible to eliminate unevenness on the surface caused by difference in the total amount of the attached toner in the target area. As a result, gloss is generated by specular reflection of light. However, because some inverse masks are calculated by equations other than Equation (1), there can be a plurality of types of inverse masks.

The inverse mask, for example, may cause the clear toner to uniformly attach to the pixels. In this case, the inverse mask is also referred to as a solid mask and is expressed by Equation (2):

$$Clr = 100 \quad (2)$$

Some of the pixels to which the surface effect is to be applied may be associated with a density rate other than 100%. Thus, there can be a plurality of types of solid masks.

Alternatively, the inverse mask may be calculated by multiplication of the background exposure rate of each color, for example. In this case, for example, the inverse mask is expressed by Equation (3):

$$Clr = 100 \times \{(100 - C)/100\} \times \{(100 - M)/100\} \times \{(100 - Y)/100\} \times \{(100 - K)/100\} \quad (3)$$

In Equation (3), (100−C)/100 represents the background exposure rate of C, (100−M)/100 represents the background exposure rate of M, (100−Y)/100 represents the background exposure rate of Y, and (100−K)/100 represents the background exposure rate of K.

Still alternatively, the inverse mask may be calculated by using a method assuming that halftone dots having the largest area ratio define the smoothness. In this case, for example, the inverse mask is expressed by Equation (4):

$$Clr = 100 - \max(C, M, Y, K) \quad (4)$$

In Equation (4), max(C,M,Y,K) indicates that the density value of a color having the largest density value among CMYK is a representative value.

In other words, the inverse mask may be expressed by any one of Equation (1) to Equation (4).

The surface effect selection table indicates correspondence relation between the density values serving as gloss-control values indicating surface effects and the types of the surface effects. In addition, the surface effect selection table indicates correspondence relation among control information related to a first post-processing device in the configuration of the image forming system 1, the image data of the clear-toner plane used in the printer device 70, and the image data of the clear-toner plane used in a second post processing device. While the image forming system 1 can have various configurations, the image forming system 1 according to the present embodiment has a configuration in which the glosser 80 and the low-temperature fixing unit 90 are connected to the printer device 70 as the post-processing devices. Therefore, the control information related to the first post-processing device in the configuration of the image forming system 1 corresponds to the ON-OFF information indicating "ON" or "OFF" of the glosser 80. The image data of the clear-toner plane used in the second post processing device may correspond to the image data of the clear-toner plane used in the low-temperature fixing unit 90. FIG. 25 is an exemplary schematic of a data structure of the surface effect selection table. The surface effect selection table can indicate the correspondence relation among the control information related to the first post-processing device, the image data of a clear-toner plane 1 used in the printer device 70 and the image data of a clear-toner plane 2 used in the second post processing device, the density values, and the types of surface effects for each different configuration of the image forming system 1. FIG. 25 illustrates a data structure corresponding to the configuration of the image forming system 1 according to the present embodiment. In the correspondence relation between the types of surface effects and the density values illustrated in FIG. 25, the types of surface effects are associated with respective value ranges of the density values. Furthermore, the types of surface effects are associated with respective rates of density (density rates) each converted from a value (a representative value) serving as a representative of a range of density values by 2%. Specifically, surface effects for providing gloss (premium gloss and gloss) are associated with ranges of density values having a density rate of equal to or larger than 84% (from "212" to "255"). By contrast, surface effects for suppressing gloss (matt and premium matt) are associated with ranges of density values having a density rate of equal to or smaller than 16% (from "1" to "43"). Surface effects, such as a texture, a background pattern, and a watermark, are associated with ranges of density values having density rates of 20% to 80%.

More specifically, premium gloss (PG) is associated with pixel values of "238" to "255" as the surface effect. In these pixel values, three different types of premium gloss are associated with respective ranges of pixel values of "238" to "242", pixel values of "243" to "247", and pixel values of "248" to "255". Gloss (G) is associated with pixel values of "212" to "232". In these pixel values, four different types of gloss are associated with respective ranges of pixel values of "212" to "216", pixel values of "217" to "221", pixel values of "222" to "227", and pixel values of "228" to "232". Matt (M) is associated with pixel values of "23" to "43". In these pixel values, four different types of matt are associated with respective ranges of pixel values of "23" to "28", pixel values of "29" to "33", pixel values of "34" to "38", and pixel values of "39" to "43". Premium matt (PM) is associated with pixel values of "1" to "17". In these pixel values, three different types of premium matt are associated with respective ranges of pixel values of "1" to "7", pixel values of "8" to "12", and pixel values of "13" to "17". These different types of the same surface effect are different from one another in equations for calculating image data of the clear-toner plane used in the printer device 70 and the low-temperature fixing unit 90, whereas the printer main body and the post-processing device each perform the same operation. No surface effect is associated with a density value of "0".

In FIG. 25, the surface effect selection table indicates the contents of the ON-OFF information indicating "ON" or "OFF" of the glosser 80, the image data of the clear-toner plane 1 (Clr-1 in FIG. 1) used in the printer device 70, and the image data of the clear-toner plane 2 used in the low-temperature fixing unit 90 in a manner associated with the pixel values and the surface effects. If the surface effect is premium gloss, it is indicated that the glosser 80 is turned ON, that the image data of the clear-toner plane 1 used in the printer device 70 is an inverse mask, and that there is no image data of the clear-toner plane 2 (Clr-2 in FIG. 1) used in the low-temperature fixing unit 90. The inverse mask is calculated from Equation 1, for example. In the example illustrated in FIG. 25, the area for which premium gloss is specified as the surface effect corresponds to the whole area specified by the image data. An explanation will be made later of an example where the area for which premium gloss is specified as the surface effect corresponds to a part of the area specified by the image data.

If the density value falls within a range of "212" to "232" and the surface effect is gloss, it is indicated that the glosser 80 is turned OFF, that the image data of the clear-toner plane 1 used in the printer device 70 is an inverse mask, and that there is no image data of the clear-toner plane 2 used in the low-temperature fixing unit 90.

The inverse mask may be expressed by any one of Equation (1) to Equation (4). In this case, because the glosser 80 is turned OFF, the unevenness on the surface increases compared with premium gloss because of difference in the total amount of the attached toner to be made smooth. As a result, gloss having glossiness lower than that of premium gloss is achieved. If the surface effect is matt, it is indicated that the glosser 80 is turned OFF, that the image data of the clear-toner plane 1 used in the printer device 70 is halftone (halftone dots), and that there is no image data of the clear-toner plane 2 used in the low-temperature fixing unit 90. If the surface effect is premium matt, it is indicated that the glosser 80 can be turned ON or OFF, that there is no image data of the clear-toner plane 1 used in the printer device 70, and that the image data of the clear-toner plane 2 used in the low-temperature fixing unit 90 is a solid mask. The solid mask is calculated from Equation 2, for example.

The clear processing 56 refers to the surface effect selection table to determine the surface effect associated with each pixel value indicated by the gloss-control plane. In addition, the clear processing 56 determines whether to turn ON or OFF the glosser 80 and determines the types of image data of the clear-toner plane to be used in the printer device 70 and the low-temperature fixing unit 90. The clear processing 56 determines whether to turn ON or OFF the glosser 80 for each page. Subsequently, as described above, the clear processing 56 generates and outputs the image data of the clear-toner plane based on the result of the determination as appropriate. In addition, the clear processing 56 outputs the ON-OFF information of the glosser 80.

The si3 unit 57 integrates the pieces of 2-bit image data of CMYK on which the halftone processing is performed and the 2-bit image data of the clear-toner plane generated by the clear processing 56 and outputs the image data thus integrated to the MIC 60. The clear processing 56 may not possibly generate at least one of the image data of the clear-toner plane used in the printer device 70 and the image data of the clear-toner plane used in the low-temperature fixing unit 90. In this case, the si3 unit 57 integrates the other image data of the clear-toner plane generated by the clear processing 56. If the clear processing 56 generates neither of the image data of the clear-toner plane used in the printer device 70 and the image data of the clear-toner plane used in the low-temperature fixing unit 90, the si3 unit 57 outputs image data obtained by integrating the pieces of 2-bit image data of CMYK. As a result, the DFE 50 outputs four to six pieces of 2-bit image data to the MIC 60. The si3 unit 57 also outputs the ON-OFF information of the glosser 80 received from the clear processing 56 to the MIC 60.

Figure 26:
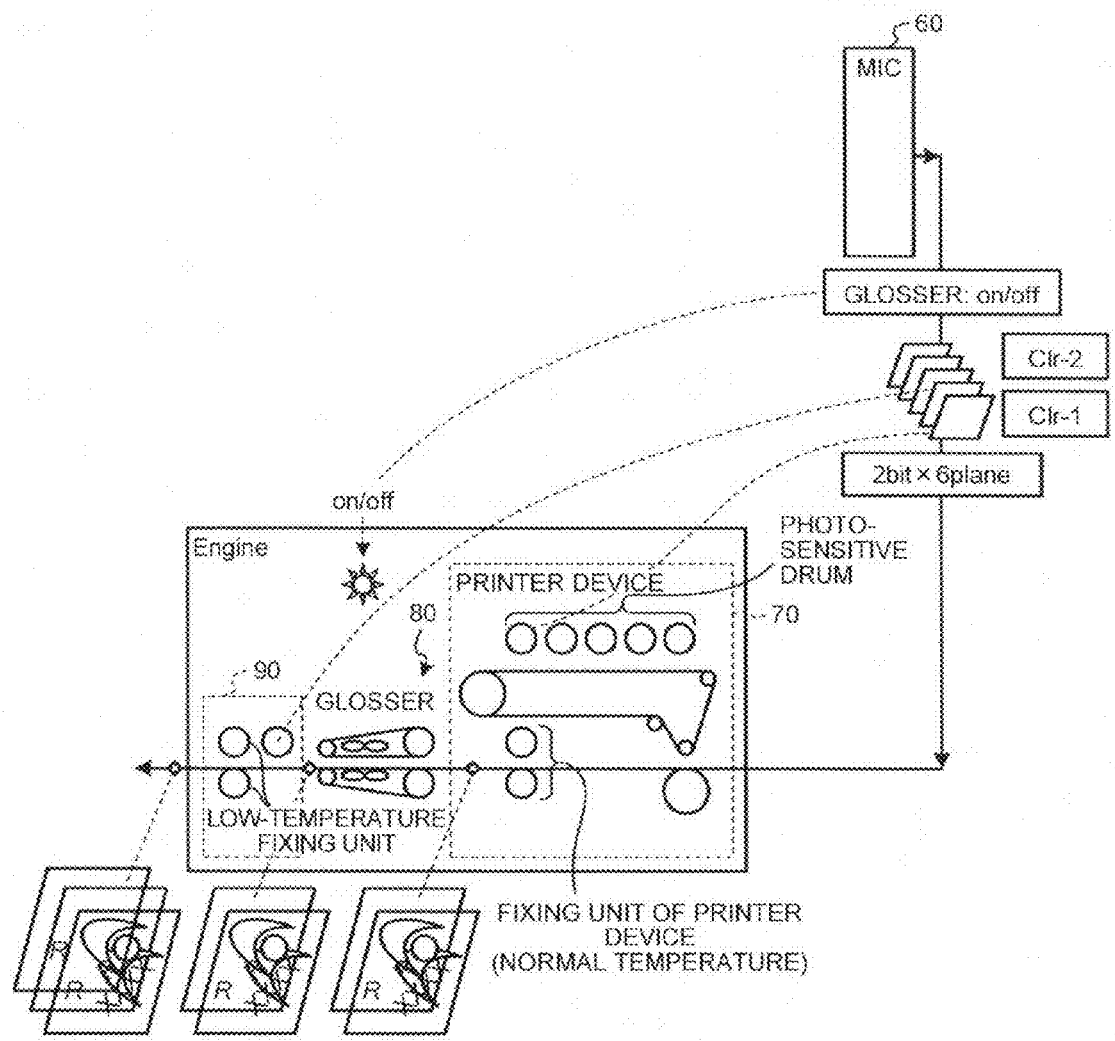
FIG. 26 is an exemplary conceptual schematic of a configuration of an MIC.

The MIC 60 is connected to the DFE 50 and the printer device 70. The MIC 60 outputs device configuration information indicating the configuration of the devices provided as the post-processing devices to the DFE 50. The MIC 60 receives pieces of image data of the color planes and pieces of image data of the clear-toner planes from the DFE 50. The MIC 60 then distributes the pieces of image data to devices corresponding thereto and controls the post-processing devices. More specifically, as illustrated in FIG. 26, the MIC 60 outputs the pieces of image data of the CMYK color planes among the pieces of image data output from the DFE 50 to the printer device 70. If there is image data of the clear-toner plane used in the printer device 70, the MIC 60 also outputs the image data of the clear-toner plane to the printer device 70. In addition, the MIC 60 uses the ON-OFF information received from the DFE 50 to turn ON or OFF the glosser 80. If there is image data of the clear-toner plane used in the low-temperature fixing unit 90, the MIC 60 outputs the image data of the clear-toner plane to the low-temperature fixing unit 90. The glosser 80 may be switched between a path for performing fixing and a path for performing no fixing based on the ON-OFF information. The low-temperature fixing unit 90 may be switched ON or OFF and switched between paths similarly to the glosser 80 based on the presence of image data of the clear-toner plane.

As illustrated in FIG. 26, a printing apparatus formed of the printer device 70, the glosser 80, and the low-temperature fixing unit 90 includes a conveying path for conveying a recording medium. Specifically, the printer device 70 includes a plurality of electrophotography photosensitive drums, a transfer belt onto which a toner image formed on the photosensitive drums is transferred, a transfer device that transfers a toner image on the transfer belt onto a recording medium, and a fixing unit that fixes a toner image on a recording medium to the recording medium. The recording medium is conveyed by a conveying member, which is not illustrated, through the positions at which the printer device 70, the glosser 80, and the low-temperature fixing unit 90 are provided in the conveying path in this order. After these devices sequentially perform processing on the recording medium to form an image and apply a surface effect thereto, the recording medium is conveyed by a conveying mechanism, which is not illustrated, in the conveying path and is ejected outside of the printing apparatus.

Figure 27:
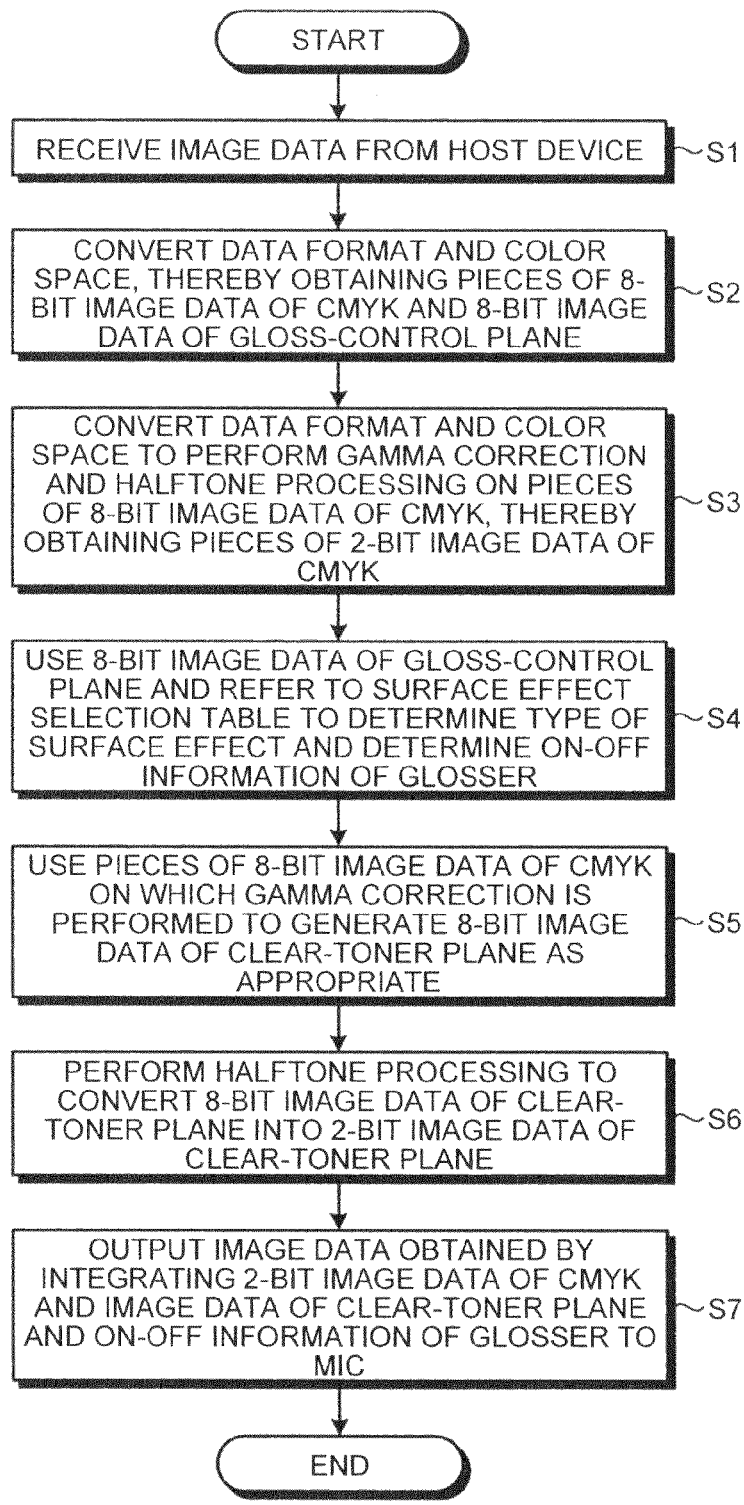
FIG. 27 is a flowchart of a procedure of gloss control performed by the image forming system.

The procedure of gloss control processing performed by the image forming system 1 according to the present embodiment will now be described with reference to FIG. 27. If the DFE 50 receives image data from the host device 10 (Step S1), the rendering engine 51 interprets the language of the image data to convert the image data expressed in a vector format into image data expressed in a raster format and converts a color space expressed in an RGB format into a color space in a CMYK format, thereby obtaining pieces of 8-bit image data of CMYK color planes and 8-bit image data of gloss-control plane (Step S2).

Figure 28:
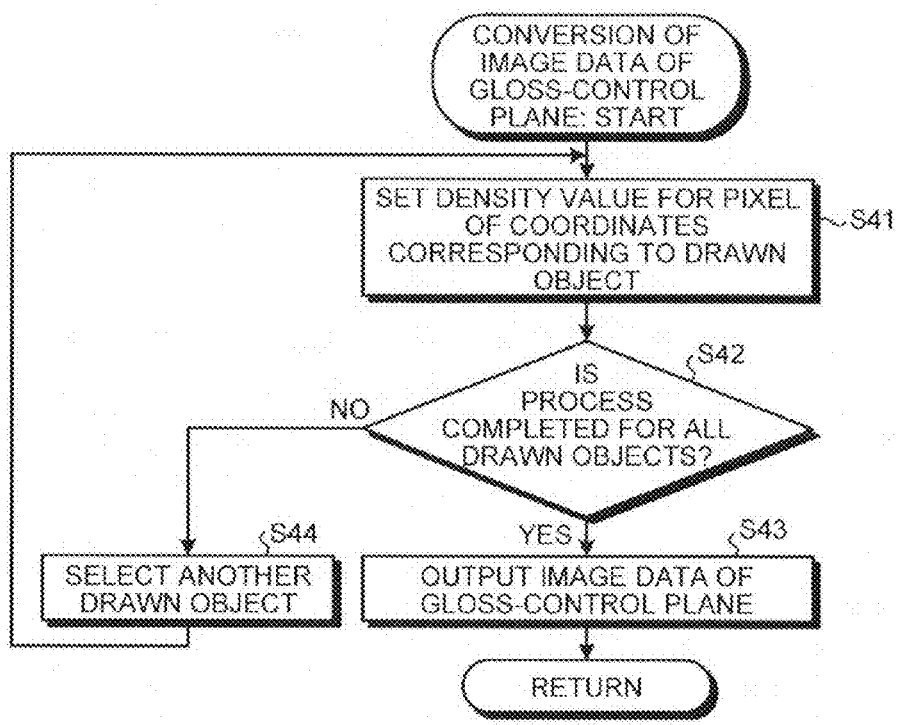
FIG. 28 is a flowchart of a procedure for converting image data of the gloss-control plane.

The process for converting the image data of the gloss-control plane at Step S2 will now be described in detail. FIG. 28 is a flowchart of the procedure for converting the image data of the gloss-control plane. The conversion process is a process for converting the image data of the gloss-control plane in FIG. 28, that is, the image data of the gloss-control plane in which the density value for determining the surface effect is specified for each drawn object illustrated in FIG. 21 into image data of the gloss-control plane in which the density value is specified for each pixel constituting the drawn object.

The rendering engine 51 sets the density values specified for the drawn object on the gloss-control plane illustrated in FIG. 21 for pixels in a range of coordinates corresponding to the drawn object (Step S41), thereby converting the image data of the gloss-control plane. The rendering engine 51 then determines whether the process is completed for all the drawn objects in the image data of the gloss-control plane (Step S42).

If the process is not completed yet (No at Step S42), the rendering engine 51 selects another drawn object which is not yet processed in the image data of the gloss-control plane (Step S44) and performs the process at Step S41 again.

By contrast, if it is determined that the process at Step S41 is completed for all the drawn objects in the image data of the gloss control plane at Step S42 (Yes at Step S42), the rendering engine 51 outputs the image data of the gloss-control plane thus converted (Step S43). Thus, the image data of the gloss-control plane is converted into image data in which the surface effect is specified for each pixel.

Referring back to FIG. 27, if the 8-bit image data of the gloss-control plane is output, the TRC 53 of the DFE 50 performs gamma correction on the pieces of 8-bit image data of the CMYK color planes using a gamma curve of 1D_LUT generated by calibration. To output the pieces of image data on which the gamma correction is performed to the printer device 70, the halftone engine 55 performs halftone processing for converting the pieces of image data into pieces of 2-bit image data of CMYK. Thus, the halftone engine 55 obtains the pieces of 2-bit image data of CMYK on which the halftone processing is performed (Step S3).

The clear processing 56 of the DFE 50 uses the 8-bit image data of the gloss-control plane and refers to the surface effect selection table, thereby determining the surface effect specified for each pixel value expressed by the image data of the gloss-control plane. The clear processing 56 then makes such determination for all the pixels constituting the gloss-control plane. In the image data of the gloss-control plane, all the pixels constituting an area to which each surface effect is to be applied basically have density values within the same range. Therefore, the clear processing 56 determines that adjacent pixels to which the same surface effect is determined to be applied are included in the area to which the same surface effect is to be applied. Thus, the clear processing 56 determines the area to which the surface effect is to be applied and the type of the surface effect to be applied to the area. In accordance with the determination, the clear processing 56 determines whether to turn ON or OFF the glosser 80 (Step S4).

Subsequently, the clear processing 56 of the DFE 50 uses the pieces of 8-bit image data of CMYK on which the gamma correction is performed as appropriate, thereby generating 8-bit image data of the clear-toner plane to which the clear toner is to be attached as appropriate (Step S5). The halftone engine 55 performs halftone processing to convert the 8-bit image data of the clear-toner plane obtained by using the pieces of 8-bit image data into 2-bit image data of the clear-toner plane (Step S6).

Subsequently, the si3 unit 57 of the DFE 50 integrates the pieces of 2-bit image data of CMYK on which the halftone processing is performed at Step S3 and the 2-bit image data of the clear-toner plane generated at Step S6. The si3 unit 57 then outputs the image data thus integrated and the ON-OFF information indicating "ON" or "OFF" of the glosser 80 determined at Step S4 to the MIC 60 (Step S7).

If the clear processing 56 generates no image data of the clear-toner plane at Step S5, the si3 unit 57 integrates only the pieces of 2-bit image data of CMYK on which the halftone processing is performed at Step S3. The si3 unit 57 then outputs the image data thus integrated to the MIC 60 at Step S7.

Specific examples corresponding to the types of surface effects will now be described. Specifically described herein are the types of surface effects of premium gloss and gloss for providing gloss and of matt and premium matt for suppressing gloss. In the description below, the same type of surface effect is specified in a single page. At Step S4, the clear processing 56 of the DFE 50 uses the density value of each pixel in the 8-bit image data of the gloss-control plane and refers to the surface effect selection table illustrated in FIG.

25. Thus, the clear processing 56 determines that the surface effect specified for a pixel having a density value of "238" to "255" is premium gloss. In this case, the clear processing 56 of the DFE 50 determines whether the area for which premium gloss is specified as the surface effect corresponds to the whole area specified by the image data. If the determination result is in the affirmative, the clear processing 56 of the DFE 50 uses the image data corresponding to the area in the pieces of 8-bit image data of CMYK on which the gamma correction is performed to generate an inverse mask by using Equation 1, for example. The data indicating the inverse mask is the image data of the clear-toner plane used in the printer device 70. Because the low-temperature fixing unit 90 uses no image data of the clear-toner plane for the area, the DFE 50 generates no image data of the clear-toner plane used in the low-temperature fixing unit 90. At Step S7, the si3 unit 57 of the DFE 50 integrates the image data of the clear-toner plane used in the printer device 70 and the pieces of 2-bit image data of CMYK on which the halftone processing is performed at Step S3. The si3 unit 57 then outputs the image data thus integrated and the ON-OFF information indicating "ON" or "OFF" of the glosser 80 to the MIC 60. The MIC 60 outputs the pieces of image data of the CMYK color planes and the image data of the clear-toner plane used in the printer device 70 serving as the image data received from the DFE 50 to the printer device 70. The MIC 60 then uses the ON-OFF information received from the DFE 50 to turn ON the glosser 80. The printer device 70 uses the pieces of image data of the CMYK color planes and the image data of the clear-toner plane received from the MIC 60 to output a light beam from the exposing unit. Thus, the printer device 70 forms a toner image corresponding to each toner on the photosensitive element. The printer device 70 then transfers the toner image onto a sheet and fixes the toner image thereon at normal temperature and pressure. As a result, the clear toner is attached to the sheet besides the CMYK toners, thereby forming an image. Subsequently, the glosser 80 presses the sheet at high temperature and high pressure. Because no image data of the clear-toner plane is output to the low-temperature fixing unit 90, the sheet is ejected with no clear toner attached thereon from the low-temperature fixing unit 90. As a result, the total amount of the attached CMYK toners and the attached clear toner is uniformly compressed in the whole area specified by the image data. Therefore, a high gloss can be obtained from the surface of the area.

By contrast, if the area for which premium gloss is specified as the surface effect corresponds to a part of the area specified by the image data, the following situation may possibly occur. The image data of the clear-toner plane indicating the inverse mask described above is used for the area for which premium gloss is specified. However, if the total amount of attached CMYK toners is set to equal to or larger than a predetermined amount for all the pixels other than the pixels of the area, pressing performed by the glosser 80 makes the total amount of the attached CMYK toners and the attached clear toner uniform in the area for which premium gloss is specified and the area in which the total amount of the attached CMYK toners is set to equal to or larger than the predetermined amount.

If the total amount of attached CMYK toners is set to equal to or larger than the predetermined amount for all the pixels constituting the area specified by the image data, for example, the same result is obtained as in the case where premium gloss is specified for the whole area specified by the image data.

To address this, if the area for which premium gloss is specified as the surface effect corresponds to a part of the area specified by the image data, the DFE 50 generates the same image data of the clear-toner plane as that in the case where premium gloss is specified for the whole area specified by the image data. After the clear toner is attached to a sheet, the glosser 80 presses the sheet. Subsequently, to provide the surface effect of premium matt to an area other than the area for which premium gloss is specified as the surface effect on the sheet pressed by the glosser 80, the DFE 50 generates image data of the clear-toner plane used in the low-temperature fixing unit 90.

Specifically, the DFE 50 generates an inverse mask as image data of the clear-toner plane used in the printer device 70 by using Equation 1 in the same manner as described above. Furthermore, the DFE 50 generates a solid mask as image data of the clear-toner plane used in the low-temperature fixing unit 90 for the area other than the area for which premium gloss is specified as the surface effect by using Equation 2. At Step S7, the si3 unit 57 of the DFE 50 integrates the image data of the clear-toner plane used in the printer device 70, the image data of the clear-toner plane used in the low-temperature fixing unit 90, and the pieces of 2-bit image data of CMYK on which the halftone processing is performed at Step S3. The si3 unit 57 then outputs the image data thus integrated and the ON-OFF information indicating "ON" of the glosser 80 to the MIC 60.

The MIC 60 outputs the pieces of image data of the CMYK color planes and the image data of the clear-toner plane used in the printer device 70 among the pieces of image data received from the DFE 50 to the printer device 70. Subsequently, the MIC 60 uses the ON-OFF information received from the DFE 50 to turn ON the glosser 80. The MIC 60 then outputs the image data of the clear-toner plane used in the low-temperature fixing unit 90 among the pieces of image data received from the DFE 50 to the low-temperature fixing unit 90. The printer device 70 uses the pieces of image data of the CMYK color planes and the image data of the clear-toner plane received from the MIC 60 to form an image to which the CMYK toners and the clear toner are attached on a sheet. Subsequently, the glosser 80 presses the sheet at high temperature and high pressure. The low-temperature fixing unit 90 uses the image data of the clear-toner plane received from the MIC 60 to form a toner image with the clear toner. The low-temperature fixing unit 90 then superimposes the toner image on the sheet passing through the glosser 80 and fixes the toner image to the sheet at low temperature and pressure. As a result, the total amount of the attached CMYK toners and the attached clear toner is uniformly compressed in the area for which premium gloss is specified. Therefore, a high gloss can be obtained from the surface of the area. By contrast, in the area other than the area for which premium gloss is specified, attachment of the clear toner using the solid mask after the pressing performed by the glosser 80 makes the surface uneven, thereby suppressing gloss on the surface of the area.

At Step S4, the clear processing 56 of the DFE 50 uses the density value of each pixel in the 8-bit image data of the gloss-control plane and refers to the surface effect selection table. Thus, the clear processing 56 determines that the surface effect specified for a pixel having a density value of "212" to "232" is gloss. Specifically, the clear processing 56 determines that the surface effect specified for a pixel having a density value of "228" to "232" is gloss type 1. In this case, the clear processing 56 of the DFE 50 uses image data corresponding to the area in the pieces of 8-bit image data of CMYK on which the gamma correction is performed to generate the inverse mask 1. The data indicating the inverse mask 1 is the image data of the clear-toner plane used in the printer device 70. Because the low-temperature fixing unit 90 uses no image data of the clear-toner plane for the area, the DFE 50 generates no image data of the clear-toner plane used in the low-temperature fixing unit 90. At Step S7, the si3 unit 57 of the DFE 50 integrates the image data of the clear-toner plane used in the printer device 70 and the pieces of 2-bit image data of CMYK on which the halftone processing is performed at Step S3. The si3 unit 57 then outputs the image data thus integrated and the ON-OFF information indicating "OFF" of the glosser 80 to the MIC 60. The MIC 60 outputs the pieces of image data of the CMYK color planes and the image data of the clear-toner plane used in the printer device 70 serving as the image data received from the DFE 50 to the printer device 70. The MIC 60 then uses the ON-OFF information received from the DFE 50 to turn OFF the glosser 80. The printer device 70 uses the pieces of image data of the CMYK color planes and the image data of the clear-toner plane used in the printer device 70 received from the MIC 60 to form an image to which the CMYK toners and the clear toner are attached on a sheet. Because the glosser 80 is turned OFF, the sheet is not pressed at high temperature and high pressure. Furthermore, because no image data of the clear-toner plane is output to the low-temperature fixing unit 90, the sheet is ejected with no clear toner attached thereon from the low-temperature fixing unit 90. As a result, the total amount of the attached CMYK toners and the attached clear toner is made relatively uniform in the area for which gloss is specified as the surface effect. Therefore, a relatively high gloss can be obtained from the surface of the area.

At Step S4, the clear processing 56 of the DFE 50 uses the density value of each pixel in the 8-bit image data of the gloss-control plane and refers to the surface effect selection table. Thus, the clear processing 56 determines that the surface effect specified for a pixel having a density value of "23" to "43" is matt. In this case, the clear processing 56 of the DFE 50 generates image data indicating halftone as the image data of the clear-toner plane used in the printer device 70. Because the low-temperature fixing unit 90 uses no image data of the clear-toner plane for the area, the DFE 50 generates no image data of the clear-toner plane used in the low-temperature fixing unit 90. At Step S7, the si3 unit 57 of the DFE 50 integrates the image data of the clear-toner plane used in the printer device 70 and the pieces of 2-bit image data of CMYK on which the halftone processing is performed at Step S3. The si3 unit 57 then outputs the image data thus integrated and the ON-OFF information indicating "OFF" of the glosser 80 to the MIC 60. The MIC 60 outputs the pieces of image data of the CMYK color planes and the image data of the clear-toner plane used in the printer device 70 serving as the image data received from the DFE 50 to the printer device 70. The MIC 60 then uses the ON-OFF information received from the DFE 50 to turn OFF the glosser 80. The printer device 70 uses the pieces of image data of the CMYK color planes and the image data of the clear-toner plane received from the MIC 60 to form an image to which the CMYK toners and the clear toner are attached on a sheet. Because the glosser 80 is turned OFF, the sheet is not pressed at high temperature and high pressure. Furthermore, because no image data of the clear-toner plane is output to the low-temperature fixing unit 90, the sheet is ejected with no clear toner attached thereon from the low-temperature fixing unit 90. As a result, halftone dots are applied with the clear toner to the area for which matt is specified as the surface effect, thereby making the surface uneven. Thus, gloss on the surface of the area is relatively suppressed.

At Step S4, the clear processing 56 of the DFE 50 uses the density value of each pixel in the 8-bit image data of the gloss-control plane and refers to the surface effect selection table. Thus, the clear processing 56 determines that the surface effect specified for a pixel having a density value of "1" to "17" is premium matt. In this case, if other surface effects are specified in a single page (described later), turning ON or OFF of the glosser 80 is determined in accordance with the specification. The clear processing 56 of the DFE 50 generates no image data of the clear-toner plane used in the printer device 70 regardless of whether the glosser 80 is turned ON or OFF. The clear processing 56 generates a solid mask as the image data of the clear-toner plane used in the low-temperature fixing unit 90. At Step S7, the si3 unit 57 of the DFE 50 integrates the image data of the clear-toner plane used in the low-temperature fixing unit 90 and the pieces of 2-bit image data of CMYK on which the halftone processing is performed at Step S3. The si3 unit 57 then outputs the image data thus integrated and the ON-OFF information indicating "ON" or "OFF" of the glosser 80 to the MIC 60. The MIC 60 outputs the pieces of image data of the CMYK color planes among the pieces of image data received from the DFE 50 to the printer device 70. Furthermore, the MIC 60 outputs the image data of the clear-toner plane used in the low-temperature fixing unit 90 among the pieces of image data received from the DFE 50 to the low-temperature fixing unit 90. The printer device 70 uses the pieces of image data of the CMYK color planes received from the MIC 60 to form an image to which the CMYK toners are attached on a sheet. If the glosser 80 is turned ON, the sheet is pressed at high temperature and high pressure by the glosser 80. By contrast, if the glosser 80 is turned OFF, the sheet is not pressed at high temperature and high pressure. The low-temperature fixing unit 90 uses the image data of the clear-toner plane received from the MIC 60 to form a toner image with the clear toner. The low-temperature fixing unit 90 then superimposes the toner image on the sheet passing through the glosser 80 and fixes the toner image to the sheet at low temperature and pressure. As a result, attachment of the clear toner using the solid mask makes the surface uneven in the area for which premium matt is specified, thereby suppressing gloss on the surface of the area.

While the explanation has been made of the case where the same surface effect is specified in a single page, even if different types of surface effects are specified in a single page, the processing described above can be employed. Specifically, if a plurality of surface effects is specified in a single page, density values corresponding to the respective types of surface effects illustrated in FIG. 25 are set for pixels in an area to which each type of surface effect is to be applied in the image data of the gloss control plane. In other words, the gloss control plane specifies an area to which a surface effect is to be applied for each type of surface effects. As a result, the DFE 50 simply needs to determine the area of pixels having the same density value to be an area to which the same surface effect is to be applied in the image data of the gloss-control plane. Therefore, it is possible to facilitate execution of each surface effect in the single page.

If a plurality of types of surface effects are specified in a single page by density values in the image data of the gloss-control plane, however, some types of surface effects can be produced simultaneously, and some types of surface effects cannot be produced simultaneously because turning ON or OFF of the glosser 80 is not switched in the single page.

As illustrated in FIG. 1, the present embodiment employs the configuration including the printer device 70, the glosser 80, and the low-temperature fixing unit 90. If the surface effects of premium gloss (PG) and premium matt (PM) are specified in a single page, the glosser 80 is turned ON for premium gloss (PG), and turning ON or OFF of the glosser 80 is determined in accordance with specification of other surface effects in the page for premium matt (PM) in accordance with FIG. 25. As a result, these two types of surface effects can be produced simultaneously in the single page.

In this case, the clear processing 56 of the DFE 50 uses the density value of each pixel in the 8-bit image data of the gloss-control plane and refers to the surface effect selection table illustrated in FIG. 25 at Step S4. Thus, the clear processing 56 determines that the surface effect specified for an area formed of pixels having a density value of "238" to "255" is premium gloss (PG). The clear processing 56 of the DFE 50 then uses image data corresponding to the area in the pieces of 8-bit image data of CMYK on which the gamma correction is performed to generate an inverse mask by using Equation 1, for example. The data indicating the inverse mask is the image data of the clear-toner plane used in the printer device 70 for the area for which the surface effect of premium gloss (PG) is specified. Because the low-temperature fixing unit 90 uses no image data of the clear-toner plane for the area for which premium gloss is specified, the DFE 50 generates no image data of the clear-toner plane used in the low-temperature fixing unit 90 for the area for which premium gloss is specified.

Furthermore, the clear processing 56 of the DFE 50 also refers to the surface effect selection table and determines that the surface effect specified for an area formed of pixels having a density value of "1" to "17" in the single page is premium matt (PM) at Step S4. In this case, the clear processing 56 of the DFE 50 turns ON the glosser 80 in accordance with the specification of premium gloss serving as other surface effects in the single page. The clear processing 56 generates no image data of the clear-toner plane used in the printer device 70 for the area for which premium matt is specified. The clear processing 56 generates a solid mask as the image data of the clear-toner plane used in the low-temperature fixing unit 90 for the area for which premium matt is specified.

At Step S7, the si3 unit 57 of the DFE 50 integrates the image data of the clear-toner plane used in the printer device 70 for the area for which premium gloss is specified, the image data of the clear-toner plane used in the low-temperature fixing unit 90 for the area for which premium matt is specified, and the pieces of 2-bit image data of CMYK on which the halftone processing is performed at Step S3. The si3 unit 57 then outputs the image data thus integrated and the ON-OFF information indicating "ON" of the glosser 80 to the MIC 60.

The MIC 60 outputs the pieces of image data of the CMYK color planes and the image data of the clear-toner plane used in the printer device 70 for the area for which premium gloss is specified among the pieces of image data received from the DFE 50 to the printer device 70. Furthermore, the MIC 60 outputs the image data of the clear-toner plane used in the low-temperature fixing unit 90 for the area for which premium matt is specified among the pieces of image data received from the DFE 50 to the low-temperature fixing unit 90. The MIC 60 then uses the ON-OFF information received from the DFE 50 to turn ON the glosser 80.

The printer device 70 uses the pieces of image data of the CMYK color planes and the image data of the clear-toner plane for the area for which premium gloss is specified received from the MIC 60 to output a light beam from the exposing unit. Thus, the printer device 70 forms a toner image corresponding to each toner on the photosensitive element. The printer device 70 then transfers the toner image onto a sheet and fixes the toner image thereon at normal temperature and pressure. As a result, the clear toner is attached to the sheet besides the CMYK toners, thereby forming an image. Subsequently, the glosser 80 presses the sheet at high temperature and high pressure.

The low-temperature fixing unit 90 uses the image data of the clear-toner plane for the area for which premium matt is specified received from the MIC 60 to form a toner image with the clear toner. The low-temperature fixing unit 90 then superimposes the toner image on the sheet passing through the glosser 80 and fixes the toner image to the sheet at low temperature and pressure. As a result, a high gloss can be obtained from the surface of the area for which premium gloss is specified as the surface effect. By contrast, in the area for which premium matt is specified as the surface effect, attachment of the clear toner using the solid mask makes the surface uneven, thereby suppressing gloss on the surface of the area.

In addition, if the surface effects of gloss (G), matt (M), and premium matt (PM) are specified in a single page in the configuration according to the present embodiment, the glosser 80 is turned OFF for gloss (G) and matt (M), and turning ON or OFF of the glosser 80 is determined in accordance with specification of other surface effects in the page for premium matt (PM) in accordance with FIG. 25. As a result, these three types of surface effects can be produced simultaneously in the single page.

This situation will be explained more specifically. At Step S4, the clear processing 56 of the DFE 50 uses the density value of each pixel in the 8-bit image data of the gloss-control plane and refers to the surface effect selection table. Thus, the clear processing 56 determines that the surface effect specified for an area formed of pixels having a density value of "212" to "232" is gloss. Specifically, the clear processing 56 determines that the surface effect specified for a pixel having a density value of "228" to "232" is gloss type 1. In this case, the clear processing 56 of the DFE 50 uses image data corresponding to the area in the pieces of 8-bit image data of CMYK on which the gamma correction is performed to generate the inverse mask 1. The data indicating the inverse mask 1 is the image data of the clear-toner plane used in the printer device 70 for the area for which gloss is specified. Because the low-temperature fixing unit 90 uses no image data of the clear-toner plane for the area for which gloss is specified, the DFE 50 generates no image data of the clear-toner plane used in the low-temperature fixing unit 90.

Furthermore, the clear processing 56 of the DFE 50 also refers to the surface effect selection table and determines that the surface effect specified for an area formed of pixels having a density value of "23" to "43" in the single page is matt (M) at Step S4. In this case, the clear processing 56 of the DFE 50 generates image data indicating halftone as the image data of the clear-toner plane used in the printer device 70 for the area for which matt is specified. Because the low-temperature fixing unit 90 uses no image data of the clear-toner plane for the area for which matt is specified, the DFE 50 generates no image data of the clear-toner plane used in the low-temperature fixing unit 90.

Moreover, the clear processing 56 of the DFE 50 also refers to the surface effect selection table and determines that the surface effect specified for an area formed of pixels having a density value of "1" to "17" in the single page is premium matt (PM) at Step S4. In this case, the clear processing 56 of the DFE 50 determines to turn OFF the glosser 80 in accordance with the specification of gloss and matt serving as other surface effects specified in the single page. The clear processing 56 generates no image data of the clear-toner plane used in the printer device 70 for the area for which premium matt is specified. The clear processing 56 generates a solid mask as the image data of the clear-toner plane used in the low-temperature fixing unit 90 for the area for which premium matt is specified.

At Step S7, the si3 unit 57 of the DFE 50 integrates the image data of the clear-toner plane used in the printer device 70 for the area for which gloss is specified, the image data of the clear-toner plane used in the printer device 70 for the area for which matt is specified, the image data of the clear-toner plane used in the low-temperature fixing unit 90 for the area for which premium matt is specified, and the pieces of 2-bit image data of CMYK on which the halftone processing is performed at Step S3. The si3 unit 57 then outputs the image data thus integrated and the ON-OFF information indicating "OFF" of the glosser 80 to the MIC 60.

The MIC 60 outputs the pieces of image data of the CMYK color planes, the image data of the clear-toner plane used in the printer device 70 for the area for which gloss is specified, and the image data of the clear-toner plane used in the printer device 70 for the area for which matt is specified serving as the pieces of image data received from the DFE 50 to the printer device 70. The MIC 60 uses the ON-OFF information received from the DFE 50 to turn OFF the glosser 80. Furthermore, the MIC 60 outputs the image data of the clear-toner plane used in the low-temperature fixing unit 90 for the area for which premium matt is specified among the pieces of image data received from the DFE 50 to the low-temperature fixing unit 90.

The printer device 70 uses the pieces of image data of the CMYK color planes, the image data of the clear-toner plane used in the printer device 70 for the area for which gloss is specified, and the image data of the clear-toner plane used in the printer device 70 for the area for which matt is specified received from the MIC 60. Thus, the printer device 70 forms a toner image to which the CMYK toners and the clear toner are attached on a sheet. Because the glosser 80 is turned OFF, the sheet is not pressed at high temperature and high pressure.

The low-temperature fixing unit 90 uses the image data of the clear-toner plane for the area for which premium matt is specified received from the MIC 60 to form a toner image with the clear toner for the area of premium matt. The low-temperature fixing unit 90 then superimposes the toner image on the sheet and fixes the toner image to the sheet at low temperature and pressure.

As a result, the total amount of the attached CMYK toners and the attached clear toner is made relatively uniform in the area for which gloss is specified as the surface effect in the single page. Thus, a relatively high gloss can be obtained from the surface of the area.

Furthermore, halftone dots are applied with the clear toner to the area for which matt is specified as the surface effect in the single page, thereby making the surface uneven. Thus, gloss on the surface of the area is relatively suppressed. Moreover, attachment of the clear toner using the solid mask makes the surface uneven in the area for which premium matt is specified as the surface effect in the single page. Thus, gloss on the surface of the area is suppressed.

As described above, if a plurality of different types of surface effects are specified in a single page and it is not necessary to switch ON or OFF the glosser 80 depending on the surface effects, the different types of surface effects can be produced in the single page. By contrast, if it is necessary to switch ON or OFF the glosser 80 in a single page, a plurality of different types of surface effects cannot be produced in the single page.

In the present embodiment that employs the configuration including the printer device 70, the glosser 80, and the low-temperature fixing unit 90, if premium gloss (PG) and gloss (G) are specified in a single page, the glosser 80 is turned ON for premium gloss (PG) and is turned OFF for gloss (G) in accordance with FIG. 25. As a result, these two types of surface effects of premium gloss (PG) and gloss (G) cannot be produced in the single page.

If different types of surface effects are specified in a single page but cannot be produced in the single page as described above, the DFE 50 produces a part of the types of surface effects among the surface effects that cannot be produced simultaneously by substituting a surface effect other than the surface effect thus specified in the present embodiment.

Figure 29:
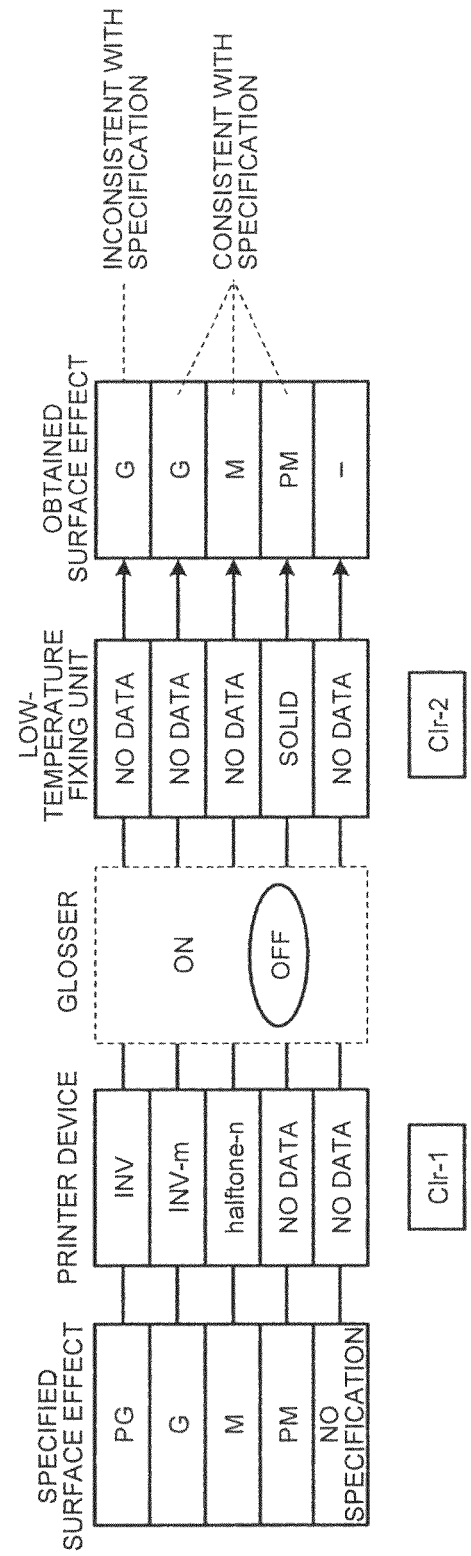
FIG. 29 is schematic of correspondence among the types of specified surface effects, image data of a clear-toner plane used in a printer device, image data of a clear-toner plane used in a low-temperature fixing unit, and actually obtained surface effects.

As illustrated in FIG. 29, for example, if four types of effects of premium gloss (PG), gloss (G), matt (M), and premium matt (PM) are specified in a single page, the DFE 50 turns OFF the glosser 80. In addition, the DFE 50 produces the surface effects of gloss, matt, and premium matt in areas of which surface effects are determined to be gloss, matt, and premium matt, respectively, in the gloss-control plane based on the density values. The DFE 50 selects gloss as a substitute surface effect in an area of which surface effect is determined to be premium gloss. Subsequently, the DFE 50 uses image data corresponding to the area in the pieces of 8-bit image data of CMYK on which the gamma correction is performed to generate any one of inverse masks A, B, and C (corresponding to INV in FIG. 29) as the image data of the clear-toner plane used in the printer device 70 in the same manner as in the case of gloss for the area of which surface effect is determined to be premium gloss. The DFE 50 generates no image data of the clear-toner plane used in the low-temperature fixing unit 90. In FIG. 25, if the density value falls within a range from "248" to "255", the DFE 50 determines the effect to be premium gloss type A and uses the inverse mask A. INV-m in FIG. 29 corresponds to inverse masks 1 to 4 in FIG. 25, and halftone-n in FIG. 29 corresponds to halftone 1 to 4 in FIG. 25. Subsequently, on a sheet ejected via the printer device 70, the glosser 80 thus turned OFF, and the low-temperature fixing unit 90 as described above, the surface effect of gloss is applied to the area for which premium gloss is specified and the area for which gloss is specified, the surface effect of matt is applied to the area for which matt is specified, and the surface effect of premium matt is applied to the area for which premium matt is specified. No surface effect is to be applied to an area not specified as an area to which a surface effect is to be applied.

As described above, the DFE 50 uses the gloss-control plane in which the density value is set for the surface effect specified by the user correspondingly to the type thereof. The DFE 50 then determines whether to perform post-processing by the post-processing devices, such as the glosser 80 and the low-temperature fixing unit 90 in the subsequent stage to the printer device 70, based on the presence of the post-processing devices and the types thereof. Thus, the DFE 50 generates image data of the clear-toner plane to which the clear toner is to be attached as appropriate. As a result, even the image forming system 1 having different configurations can generate image data of the clear-toner plane to which a common surface effect is to be applied. By attaching the clear toner to an image formed by the toner images of CMYK based on the image data of the clear-toner plane, the image forming system 1 can apply various surface effects. As a result, the user can apply a desired surface effect with the clear toner to a printed material on which an image is formed without any trouble.

In the present embodiment, the density value that specifies the surface effect is set for each pixel of the image data of the gloss-control plane. Therefore, it is possible to apply a plurality of types of surface effects in a single page of sheets.

In the image forming system according to the present embodiment, the preview image processing unit 125 generates a preview image based on document data generated by the plane data generating unit 122. As a first modification, however, the preview image processing unit 125 may generate a preview image based on document data generated by the print data generating unit 123. In this case, the preview image processing unit 125 generates a preview image by extracting the document data from print data and performing the same processing as described in the present embodiment on the document data.

While the plane data generating unit 122 and the print data generating unit 123 are included in a single device in the present embodiment, they may be included in respective separate devices as a second modification.

As a third modification, not the host device 10 but the DFE 50 may include a preview image processing unit. In this case, the preview image processing unit generates a preview image based on image data included in print data received from the host device 10.

As a fourth modification, a part of the processing performed by a device in the image forming system 1 according to the present embodiment may be performed by one or more devices on a cloud connected to the device via a network.

Figure 30:
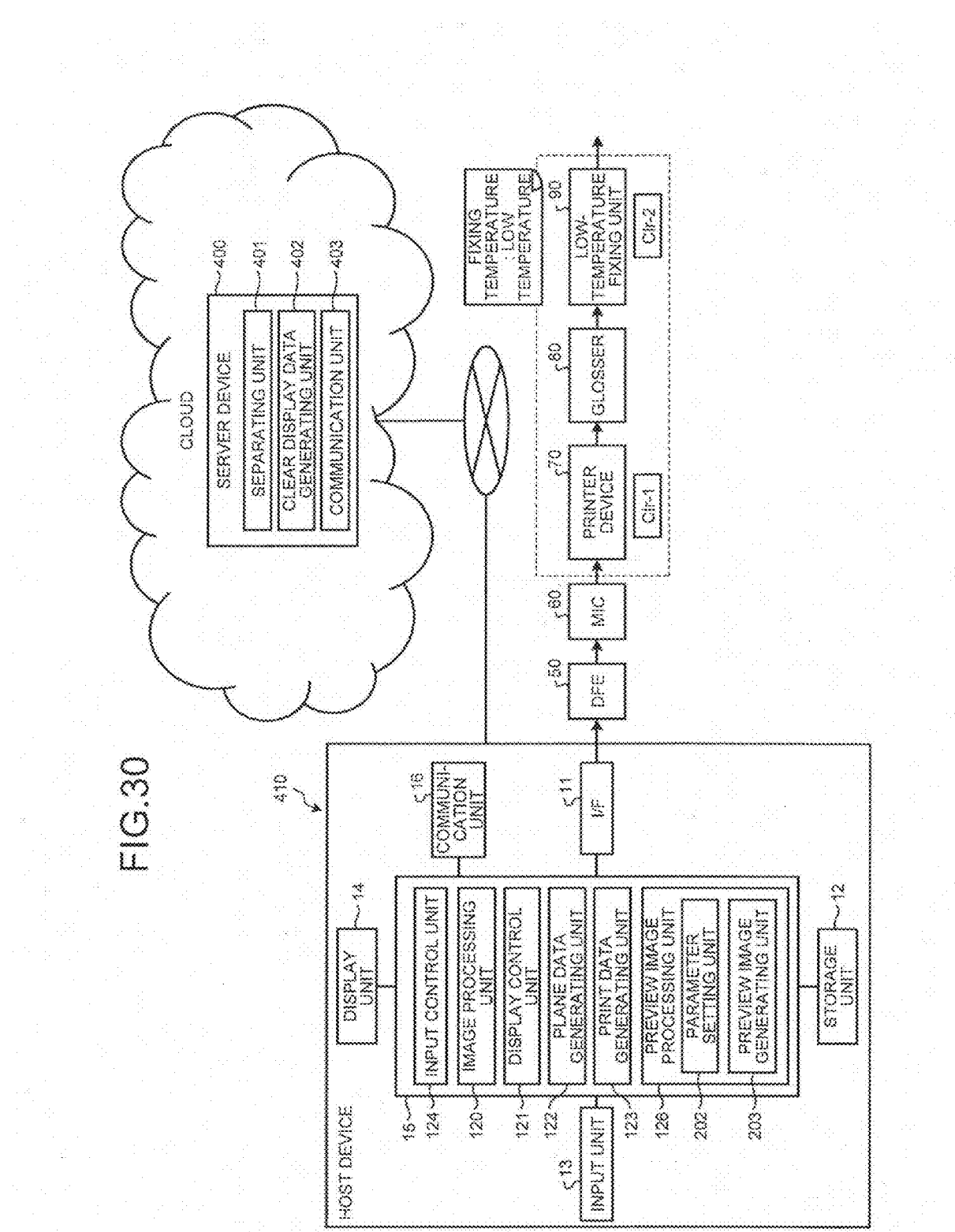
FIG. 30 is a block diagram of an image forming system according to a modification of the present invention.

FIG. 30 is a block diagram of an image forming system including a server device 400 connected to a host device 410 via a network serving as an example of the system described above. In the image forming system illustrated in FIG. 30, the server device 400 includes a communication unit 403 that communicates with the host device 410 via the network, a separating unit 401, and a clear display data generating unit 402. The host device 410 includes a communication unit 16 in addition to the components described in the present embodiment. A preview image processing unit 126 of the host device 410 includes a parameter setting unit 202 and a preview image generating unit 203.

In the fourth modification, the separating unit 401 of the server device 400 receives document data from the host device 410 via the communication unit 403 to separate the document data. Clear display data generated by the clear display data generating unit 402 is transmitted to the host device 410 via the communication unit 403.

The host device 410 receives the clear display data from the server device 400 via the communication unit 16. The parameter setting unit 202 and the preview image generating unit 203 of the preview image processing unit 126 uses the clear display data received from the server device 400 to generate a preview image.

The processing performed by a server device is not limited to that in this example, and the server device may perform a part of the processing performed by the image forming system 1 according to the present embodiment. The server device may further include a parameter setting unit and specify parameters to be supplied to a preview image generating unit included in a host device, for example. In this case, the preview image generating unit included in the host device uses the parameters received from the server device to generate a preview image. In this case, the server device includes a reflectance storage unit and a determination rule storage unit.

An image forming system may include two or more server devices. In this case, a part of the processing performed by the image forming system according to the present embodiment is distributed to the server devices. The processing distributed to the server devices may be set arbitrarily.

Figure 31:
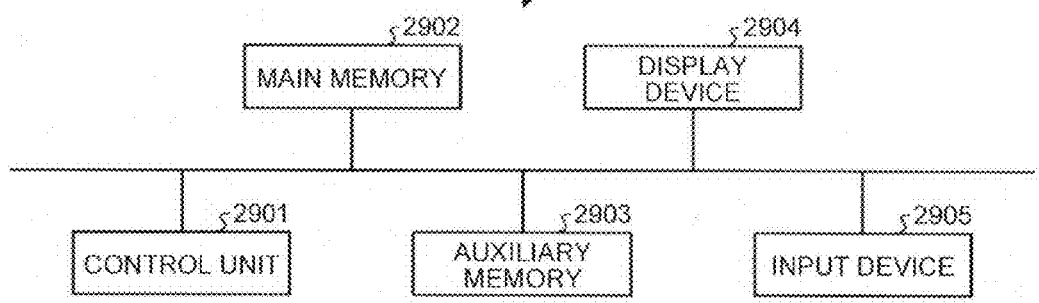
FIG. 31 is a block diagram of a hardware configuration of the host device, the DFE, and a server device.

The hardware configuration of the host devices 10 and 410, the DFE 50, and the server device 400 according to the present embodiment will now be described. FIG. 31 is a block diagram of the hardware configuration of the host devices 10 and 410, the DFE 50, and the server device 400. The host devices 10 and 410, the DFE 50, and the server device 400 mainly include, as its hardware configuration, a control device 2901 such as a CPU, a main memory 2902 such as a ROM and a RAM, an auxiliary memory 2903 such as an HDD, an input device 2905 such as a keyboard and a mouse, and a display device 2904 such as a display. The control device 2901 collectively controls the devices. The main memory 2902 stores therein various types of data and computer programs. The auxiliary memory 2903 stores therein various types of data and computer programs. This hardware configuration employs general computers.

An image processing program (including an image processing application; the same shall apply hereinafter) executed in the host devices 10 and 410 according to the present embodiment is provided as a computer program product in a manner recorded in a computer-readable recording medium, such as a compact disk read-only memory (CD-ROM), a flexible disk (FD), a compact disk recordable (CD-R), and a digital versatile disk (DVD), as a file in an installable or executable format.

The image processing program executed in the host devices 10 and 410 according to the present embodiment may be provided in a manner stored in a computer connected to a network such as the Internet to be made available for downloads via the network. Furthermore, the image processing program executed in the host devices 10 and 410 according to the present embodiment may be provided or distributed over a network such as the Internet.

The image processing program executed in the host devices 10 and 410 according to the present embodiment may be provided in a manner incorporated in advance in a ROM or the like.

The image processing program executed in the host devices 10 and 410 according to the present embodiment has a module configuration including each unit described above (the data processing unit, the plane data generating unit, the print data generating unit, the input control unit, and the display control unit). In actual hardware, the CPU (processor) reads and executes the image processing program from the recording medium described above to load each unit on the main memory. Thus, the data processing unit, the plane data generating unit, the print data generating unit, the input control unit, and the display control unit are generated on the main memory.

The print control processing performed by the DFE 50 according to the present embodiment may be executed by a print control program serving as software besides by hardware. In this case, the print control program executed in the DFE 50 according to the present embodiment is provided in a manner incorporated in advance in a ROM or the like.

The print control program executed in the DFE 50 according to the present embodiment may be provided as a computer program product in a manner recorded in a computer-readable recording medium, such as a CD-ROM, an FD, a CD-R, and a DVD, as a file in an installable or executable format.

The print control program executed in the DFE 50 according to the present embodiment may be provided in a manner stored in a computer connected to a network such as the Internet to be made available for downloads via the network. Furthermore, the print control program executed in the DFE 50 according to the present embodiment may be provided or distributed over a network such as the Internet.

The print control program executed in the DFE 50 according to the present embodiment has a module configuration including each unit described above (the rendering engine, the halftone engine, the TRC, the sit unit, the si2 unit, the si3 unit, and the clear processing). In actual hardware, the CPU (processor) reads and executes the print control program from the ROM to load each unit on the main memory. Thus, the rendering engine, the halftone engine, the TRC, the si1 unit, the sit unit, the si3 unit, and the clear processing are generated on the main memory.

The processing for generating each data performed by the server device 410 according to the present embodiment may be executed by a generation program serving as software besides by hardware. In this case, the generation program executed in the server device 400 according to the present embodiment is provided in a manner incorporated in advance in a ROM or the like.

The computer program for generating each data executed in the server device 400 according to the present embodiment may be provided as a computer program product in a manner recorded in a computer-readable recording medium, such as a CD-ROM, an FD, a CD-R, and a DVD, as a file in an installable or executable format.

The computer program for generating each data executed in the server device 400 according to the present embodiment may be provided in a manner stored in a computer connected to a network such as the Internet to be made available for downloads via the network. Furthermore, the computer program for generating each data executed in the server device 400 according to the present embodiment may be provided or distributed over a network such as the Internet.

The computer program for generating each data executed in the server device 400 according to the present embodiment has a module configuration including each unit described above (the plane data generating unit, the print data generating unit, and the clear processing). In actual hardware, the CPU (processor) reads and executes the generation program from the ROM to load each unit on the main memory. Thus, the plane data generating unit, the print data generating unit, and the clear processing are generated on the main memory.

While the image forming system 1 according to the present embodiment includes the host devices 10 and 410, the DFE 50, the MIC 60, the printer device 70, the glosser 80, and the low-temperature fixing unit 90, the configuration is not limited thereto. The DFE 50, the MIC 60, and the printer device 70 may be integrated as one image forming apparatus, for example. Furthermore, these devices may be formed as an image forming apparatus further including the glosser 80 and the low-temperature fixing unit 90.

While the image forming system 1 according to the present embodiment forms an image with a plurality of color toners of CMYK, the image forming system 1 may form an image with one color toner.

While the printer system according to the present embodiment includes the MIC 60, the configuration is not limited thereto. The configuration may not include the MIC 60 by causing other devices, such as the DFE 50, to perform the processing and the function of the MIC 60.

The present invention can display a preview image that facilitates a user's grasping of a print result of each type of processing with a transparent developer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus that performs display processing of a preview image showing a result of image formation of document data in an image forming apparatus,
the document data including color plane image data and transparent plane image data,
the color plane image data including a plurality of drawing areas and indicating a first area for which use of a color developer in the image forming apparatus is specified,
the transparent plane image data indicating a second area for which use of a transparent developer in the image forming apparatus is specified together with a type of transparent processing performed on the second area, from among a plurality of types of transparent processing, by using the transparent developer in units of the plurality of drawing areas,
the display processing apparatus comprising:
a transparent display data generating unit that generates, based on the document data, a plurality of pieces of transparent display data that show a result of image formation corresponding to the plurality of types of transparent processing performed with the transparent developer on the plurality of drawing areas on which a same transparent processing is performed for each of the plurality of types of transparent processing;
a preview image generating unit that arranges a color display plane on which the color plane image data is displayed at a predetermined position in the preview image and arranges, in a superimposed manner, a plurality of transparent display planes on which the plurality of pieces of transparent display data are displayed at corresponding plurality of positions in the preview image so as to generate the preview image obtained by projecting the color display plane and the plurality of transparent display planes that are arranged in a three-dimensional space onto a two-dimensional plane, the corresponding plurality of positions being determined based on the predetermined position of the color display plane in accordance with a predetermined rule and being different from the predetermined position of the color display plane; and
a display control unit that displays the preview image on a display screen,
wherein the plurality of types of transparent processing performed on the plurality of drawing areas correspond to a plurality of surface effects applied to the plurality of drawing areas, and
wherein a particular surface effect, from among the plurality of surface effects, is selected to be applied to one of the plurality of drawing areas based on a density of at least one pixel of the one of the plurality of drawing areas.

2. The display processing apparatus according to claim 1 further comprising:
a storage unit that stores therein the plurality of types of transparent processing and a first reflectance of light output to the plurality of transparent display planes corresponding to the plurality of types of transparent processing in a manner associated with each other and further stores therein a second reflectance of light output to the color display plane, wherein
the preview image generating unit edits the color plane image data based on the second reflectance of the color display plane stored in the storage unit, edits the plurality of pieces of transparent display data corresponding to the plurality of types of transparent processing based on the first reflectance associated with the plurality of types of transparent processing in the storage unit, and arranges the color display plane on which the edited color plane image data is displayed and the transparent display planes on which the edited plurality of pieces of transparent display data are displayed, so as to generate the preview image.

3. The display processing apparatus according to claim 1, wherein the preview image generating unit generates, based on a three-dimensional model in which the color display plane is arranged at a predetermined three-dimensional position in a depth direction perpendicular to the display screen and the plurality of transparent display planes are arranged at corresponding plurality three-dimensional positions that are closer to an observer of the display screen than the predetermined three-dimensional position of the color display plane in the depth direction and that are different from one another in the depth direction, the preview image in which the color display plane is arranged at the predetermined three-dimensional position and the plurality of transparent display planes are arranged at the corresponding plurality of three-dimensional positions that are different from one another.

4. The display processing apparatus according to claim 1, further comprising:
a receiving unit that receives a display switching instruction to switch display and non-display of the plurality of transparent display planes from a user, wherein
the display control unit switches the display and non-display of the plurality of transparent display planes included in the preview image individually in accordance with the display switching instruction received by the receiving unit.

5. The display processing apparatus according to claim 1, wherein the plurality of types of transparent processing include gloss control processing for applying a gloss effect and clear image formation processing for forming a clear image.

6. A display processing system that performs display processing of a preview image showing a result of image formation of document data in an image forming apparatus,
the document data including color plane image data and transparent plane image data,
the color plane image data including a plurality of drawing areas and indicating a first area for which use of a color developer in the image forming apparatus is specified,
the transparent plane image data indicating a second area for which use of a transparent developer in the image forming apparatus is specified together with a type of transparent processing performed on the second area, from among a plurality of types of transparent processing, by using the transparent developer in units of the plurality of drawing areas,
the display processing system comprising:
a transparent display data generating unit that generates, based on the document data, a plurality of pieces of transparent display data that show a result of image formation corresponding to the plurality of types of transparent processing performed with the transparent developer on the plurality of drawing areas on which a same transparent processing is performed for each of the plurality of types of transparent processing;
a preview image generating unit that arranges a color display plane on which the color plane image data is displayed at a predetermined position in the preview image and arranges, in a superimposed manner, a plurality of transparent display planes on which the plurality of pieces of transparent display data are displayed at corresponding plurality of positions in the preview image so as to generate the preview image obtained by projecting the color display plane and the plurality of transparent display planes that are arranged in a three-dimensional space onto a two-dimensional plane, the corresponding plurality of positions being determined based on the predetermined position of the color display plane in accordance with a predetermined rule and being different from the predetermined position of the color display plane; and
a display control unit that displays the preview image on a display screen,
wherein the plurality of types of transparent processing performed on the plurality of drawing areas correspond to a plurality of surface effects applied to the plurality of drawing areas, and
wherein a particular surface effect, from among the plurality of surface effects, is selected to be applied to one of the plurality of drawing areas based on a density of at least one pixel of the one of the plurality of drawing areas.

7. A display processing method for performing display processing of a preview image showing a result of image formation of document data in an image forming apparatus,
the document data including color plane image data and transparent plane image data,
the color plane image data including a plurality of drawing areas and indicating a first area for which use of a color developer in the image forming apparatus is specified,
the transparent plane image data indicating a second area for which use of a transparent developer in the image forming apparatus is specified together with a type of transparent processing performed on the second area, from among a plurality of types of transparent processing, by using the transparent developer in units of the plurality of drawing areas,
the display processing method comprising:
generating, based on the document data, a plurality of pieces of transparent display data that show a result of image formation corresponding to the plurality of types of transparent processing performed with the transparent developer on the plurality of drawing areas on which a same transparent processing is performed for each of the plurality of types of transparent processing;
generating the preview image by arranging a color display plane on which the color plane image data is displayed at a predetermined position in the preview image, arranging, in a superimposed manner, a plurality of transparent display planes on which the plurality of pieces of transparent display data are displayed at corresponding plurality of positions in the preview image and projecting the color display plane and the plurality of transparent display planes that are arranged in a three-dimensional space onto a two-dimensional plane, the corresponding plurality of positions being determined based on the predetermined position of the color displayplane in accordance with a predetermined rule and being different from the predetermined position of the color display plane; and
displaying the preview image on a display screen,
wherein the plurality of types of transparent processing performed on the plurality of drawing areas correspond to a plurality of surface effects applied to the plurality of drawing areas, and
wherein a particular surface effect, from among the plurality of surface effects, is selected to be applied to one of the plurality of drawing areas based on a density of at least one pixel of the one of the plurality of drawing areas.

8. A computer program product comprising a non-transitory computer-readable medium including a computer program for performing display processing of a preview image showing a result of image formation of document data in an image forming apparatus, the document data including color plane image data and transparent plane image data, the color plane image data including a plurality of drawing areas and indicating a first area for which use of a color developer in the image forming apparatus is specified, the transparent plane image data indicating a second area for which use of a transparent developer in the image forming apparatus is specified together with a type of transparent processing performed on the second area, from among a plurality of types of transparent processing, by using the transparent developer in units of the plurality of drawing areas, the computer program causing a computer to execute a method comprising:

generating, based on the document data, a plurality of pieces of transparent display data that show a result of image formation corresponding to the plurality of types of transparent processing performed with the transparent developer on the plurality of drawing areas on which a same transparent processing is performed for each of the plurality of types of transparent processing;

generating the preview image by arranging a color display plane on which the color plane image data is displayed at a predetermined position in the preview image, arranging, in a superimposed manner, a plurality of transparent display planes on which the plurality of pieces of transparent display data are displayed at corresponding plurality of positions in the preview image and projecting the color display plane and the plurality of transparent display planes that are arranged in a three-dimensional space onto a two-dimensional plane, the corresponding plurality of positions being determined based on the predetermined position of the color display plane in accordance with a predetermined rule and being different from the predetermined position of the color display plane; and displaying the preview image on a display screen, wherein the plurality of types of transparent processing performed on the plurality of drawing areas correspond to a plurality of surface effects applied to the plurality of drawing areas, and wherein a particular surface effect, from among the plurality of surface effects, is selected to be applied to one of the plurality of drawing areas based on a density of at least one pixel of the one of the plurality of drawing areas.

* * * * *